US006756887B2

(12) United States Patent
Evans

(10) Patent No.: US 6,756,887 B2
(45) Date of Patent: Jun. 29, 2004

(54) METHOD AND APPARATUS FOR THE DYNAMIC VECTOR CONTROL OF AUTOMATIC VARIABLE RANGE AND DIRECTIONAL RECEPTION OF GPS GLOBAL POSITIONING SIGNALS, DYNAMIC VEHICLE TRACKING, REMOTE NOTIFICATION OF COLLISION AND SYNTHETIC VOICE DATA COMMUNICATIONS

(76) Inventor: Wayne W. Evans, 16218 Henderson Rd., Alpharetta, GA (US) 30004

(*) Notice: Subject to any disclaimer, the term of this patent is extended or adjusted under 35 U.S.C. 154(b) by 207 days.

(21) Appl. No.: 09/911,306

(22) Filed: Jul. 23, 2001

(65) Prior Publication Data

US 2003/0016147 A1 Jan. 23, 2003

(51) Int. Cl.$^{7}$ .................... B60Q 1/06

(52) U.S. Cl. .................... 340/436; 340/988; 701/213; 701/301

(58) Field of Search .................... 340/988, 995.1, 340/435, 903, 436, 961; 701/301.2 B; 342/457

(56) References Cited

U.S. PATENT DOCUMENTS 5,311,197 A * 5/1994 Sorden et al. .............. 342/457
6,076,028 A * 6/2000 Donnelly et al. ............. 701/45
6,266,617 B1 * 7/2001 Evans ........................ 701/301
6,442,485 B2 * 8/2002 Evans ........................ 701/301
6,459,365 B2 * 10/2002 Tamura ................... 340/425.5
6,459,988 B1 * 10/2002 Fan et al. ................... 701/213
6,462,706 B2 * 10/2002 Decker ....................... 701/214

* cited by examiner

*Primary Examiner*—Brent A. Swarthout
(74) *Attorney, Agent, or Firm*—Patent Focus, Inc.; Richard C. McComas

(57) ABSTRACT

A Dynamic Vector Control of an Automatic Variable Range and Directional Reception of GPS Global Positioning signals, Dynamic Vehicle Tracking, Remote Notification of Collision and Synthetic Voice Data Communications. The Dynamic Vector Control of vehicle location, collision notification, and synthetic voice communication having, if desired, three distinct operating modes: pre-collision, collision, and post-collision with another vehicle or object. The Dynamic Vector Control commands and controls a plurality of data structures formulated into instruction modules formulated the present or projected geographical position of a vehicle.

6 Claims, 25 Drawing Sheets

GPS Search File Format:
XXXXYYYY.ABC
(X = Latitude, Y = Longitude)

GPS Input Data Fields:

Degree Size "A" Rotation "B" and Hemisphere "C" Combinations

| | A#1 | A#2 | A#3 | A#4 | A#5 | A#6 | A#7 | A#8 | B#1 | B#2 | B#3 | B#4 | B#5 | B#6 | B#7 | B#8 | C#1 | C#2 | C#3 | C#4 | C#5 | C#6 | C#7 | C#8 |
|---|---|---|---|---|---|---|---|---|---|---|---|---|---|---|---|---|---|---|---|---|---|---|---|---|
| **Field #4, Degree Size for "A"** (126) | | | | | | | | | | | | | | | | | | | | | | | | |
| 1 (=> 100 Longitude) | O | | O | | O | | O | | | | | | | | | | | | | | | | | |
| 9 (Less Than 100 Deg. Longitude) | | O | | O | | O | | O | | | | | | | | | | | | | | | | |
| 0 (Less Than 100 Deg. Longitude) | | O | | O | | O | | O | | | | | | | | | | | | | | | | |
| Null (Less Than 100 Deg. Longitude) | | O | | O | | O | | O | | | | | | | | | | | | | | | | |
| **Field #5, Rotation Direction for "B"** (127) | | | | | | | | | | | | | | | | | | | | | | | | |
| W (0-180 Deg. West) | | | | | | | | | O | O | | | O | O | | | | | | | | | | |
| E (Not West so 0-180 Deg. East) | | | | | | | | | | | O | O | | | O | O | | | | | | | | |
| 0 (Not West so 0-180 Deg. East) | | | | | | | | | | | O | O | | | O | O | | | | | | | | |
| Null (Not West so 0-180 Deg. East) | | | | | | | | | | | O | O | | | O | O | | | | | | | | |
| **Field #3, Hemisphere for "C"** (128) | | | | | | | | | | | | | | | | | | | | | | | | |
| N (Northern) | | | | | | | | | | | | | | | | | O | O | O | O | | | | |
| S (Not Northern so Southern) | | | | | | | | | | | | | | | | | | | | | O | O | O | O |
| 0 (Not Northern so Southern) | | | | | | | | | | | | | | | | | | | | | O | O | O | O |
| Null (Not Northern so Southern) | | | | | | | | | | | | | | | | | | | | | O | O | O | O |

Preferred Combinations of A, B, and C:

1. XXXXYYYY .A1B1C1 = 1,W,N
2. XXXXYYYY .A2B2C2 = 9,W,N = 0,W,N = Null,W,N
3. XXXXYYYY .A3B3C3 = 1,E,N = 1,0,N = 1,Null,N
4. XXXXYYYY .A4B4C4 = 9,E,N = 0,0,N = Null,Null,N
5. XXXXYYYY .A5B5C5 = 1,W,S = 1,W,0 = 1,W,Null
6. XXXXYYYY .A6B6C6 = 9,W,S = 0,W,0 = Null,W,Null
7. XXXXYYYY .A7B7C7 = 1,E,Null = 1,0,0 = 1,Null,Null
8. XXXXYYYY .A8B8C8 = 9,E,S = 0,0,0 = Null,Null,Null

129

Fig. 24

METHOD AND APPARATUS FOR THE DYNAMIC VECTOR CONTROL OF AUTOMATIC VARIABLE RANGE AND DIRECTIONAL RECEPTION OF GPS GLOBAL POSITIONING SIGNALS, DYNAMIC VEHICLE TRACKING, REMOTE NOTIFICATION OF COLLISION AND SYNTHETIC VOICE DATA COMMUNICATIONS

FIELD OF THE INVENTION

The invention relates, in general, to an apparatus for the Dynamic Vector Control of automatic vehicle location, collision notification, and synthetic voice communication. In particular, the invention relates to a controller with a memory, a Global Positioning System, and means for wireless communication connectively disposed within a vehicle. More particularly the invention relates to a plurality of data structures stored in the memory wherein the data structures are formulated into instruction modules to direct the functioning of the controller.

BACKGROUND OF THE INVENTION

Travel information has long been available to motorists of all types. Historically, motorists in all types of vehicles would ask route or travel directions from gas station attendants, and convenience store operators or they would consult a map of the local area in question. In 1967, the Global Positioning System (GPS) became commercially available. The GPS system consists of a plurality of satellites that are in orbit around the earth and beam positional information towards the surface of the earth. A receiver on the surface of the earth may, if desired, receive the beamed signals and is able to determine their relative positions. If the receiver is mounted in a vehicle such as an automobile, truck, airplane, or motorcycle, the relative position and direction of travel can be determined by receiving multiple GPS signals and computing the direction of travel. An example of this type of navigational system is produced by ALK Associates under the product name of CO-Pilot 2000.

The motorist, operator, driver, or user of the CO-Pilot 2000 system communicates with the system by entering information concerning this expected destination and CO-Pilot 2000 plots the trip using GPS information. The CO-Pilot 2000 may, if desired, enunciate approaching intersections and respond to specific voice commands from the user. This type of system is dedicated to the vehicle and the navigational information derived from GPS positional notation of the vehicle is for the users of the system and is not transmitted to a third party. If the user in the vehicle desires communication with a third party, he must use a wireless form of communication such as an analog or digital telephone i.e., cellular or PCS telephone.

An automatic communication link between a user in the vehicle and the third party can be established. Current technology permits collision detection of the vehicle and notification of the collision to a third party. The Transportation Group of Veridian Engineering Company develops similar systems for other companies. General Motors sells a related product entitled the Mayday System. The Mayday System combines Co-Pilot 2000 like technology with wireless telephone technology to produce a system that automatically communicates the vehicle's position to a third party. The third party is a tracking station or base station that is operator attended. If the user is involved in a vehicular collision, the Mayday System senses the collision when the internal Air Bag is activated and notifies the base station via wireless communication. The actual vehicular collision sensors encode the collision event in digital data form and transmit the data to the base station. The receiving base station plots the data on an operator attended computer screen. The operator can visually recognize that a particular vehicle collision has occurred and can take appropriate action or perform a predetermined sequence of tasks. Examples of predetermined tasks may include contacting emergency services in the vicinity of the vehicular collision or communicating directly with the vehicle to determine the extent of damage to the vehicle, or injuries to the driver or vehicle occupants. In effect, the third party contacted by the Mayday system directs the efforts to a fourth party. The fourth party may be emergency services of some type or any other response to the directive data from the vehicle.

The Mayday system is predicated on the need for receiving the third party base station operator having a computer screen capable of plotting the received encoded digital information from the vehicle in order to determine its location. The user must also be physically able to respond to voice communications from the base station operator. The functional caveat of the Mayday System is that if no encoded information is received from the vehicle the base station operator will never be informed that a vehicular collision has occurred. If the user of the Mayday system is physically impaired due to the inability to speak or does not speak the language of the base station operator, the user cannot communicate directly with the operator.

It would be desirable to have an automatic vehicle location and collision notification system that would ascertain if a vehicular collision had occurred and communicate directly with an emergency facility. The system would notify an emergency facility in the vicinity of the vehicular collision without first notifying an intermediate operator who has to relay the collision event and possible emergency necessity to the emergency facility. The system would be capable of transmitting vehicle collision location data and pertinent data concerning the vehicle operator or occupants. It would be able to translate and transform this data into synthetic voice communication using any desired language for the present location of the vehicle. The synthetic voice communication would speak the vehicle collision location and pertinent data directly to a third party who would immediately dispatch emergency personnel to the collision location. If the system were unable to communicate with a first selected third party, the system would speak the data to a second or subsequent selected third party. This process of communicating would continue until a voice link between the system and a third party was established.

SUMMARY OF THE INVENTION

A motorist, operator, driver, or user of the present invention may at some point in his operation of a vehicle be involved in a collision with another vehicle or object. If the user is physically impaired or mute during pre-collision, collision, or post-collision he may not be able to communicate with a recipient of an emergency communiqué or third party to gain emergency services.

The present invention is an apparatus for dynamic vector control of vehicle location, collision notification, and synthetic voice communication to a selected recipient or third party i.e., emergency services, any subsequent desired recipient, or third party directly from the vehicle. The present invention does not rely on communication to the recipient or third party via a base-station operator who then relays the communiqué to the emergency service. The present invention may, if desired, communicate with any selected recipient or third party even if there is no immediate collision or emergency. An example of the user desiring to communicate with the recipient or third party is the user who is physically impaired and desires to communicate his present vehicle navigation position to the recipient or third party. The present invention may, if desired, be polled or interrogated locally or remotely as to the vehicle's present navigational location and other pertinent vehicle and occupant information. The polling or interrogating remotely may, if desired, be accomplished without notifying the driver or occupants of the vehicle. All transmissions of navigational location of the vehicle or attributes concerning the driver or other occupants of the vehicle are by synthetic voice. If desired all information or data collected during a collision may be manually retrieved either by synthetic voice or in digital data using a simple Text Editor with a laptop PC or equivalent connected to the system serial port.

The present invention has a computer or controller with a memory. The memory may, if desired, be a combination of types such as a read only memory as with a CD-ROM, an encoded floppy disk, a Read/Write sold state memory or random access either dynamic or static. A Global Positioning System and means for wireless communication are connected to the controller in the vehicle. The memory has stored therein a plurality of data structures formulated into interactive instruction modules to direct the functioning of the controller. The memory further has stored therein at least one vector navigational location record and statistical information about preceding events such as a collision profile.

A Global Positioning Module receives navigation or position data from the Global Positioning System. The Global Positioning Module selectively translates the received data into the vehicle's present navigational position. An Automatic Speed Controlled Location Detection Module in communication with the Global Positioning Module dynamically searches the memory for a match between the vehicle's present navigational position and the navigational location record. An Automatic Speed Controlled Collision Detection Module receives at least one vehicle collision indicator from at least one vehicle collision sensor. The Automatic Speed Controlled Collision Detection Module in communication with the Automatic Speed Controlled Location Detection Module formulates the match between the vehicle's navigational position and the navigational location record into a collision event. A Data to Speech Translation Module in communication with the Automatic Speed Controlled Collision Detection Module translates the collision event into a synthetic voice. A Wireless Voice Communications Module in communication with the Data to Speech Translation Module and the means for wireless communication transmits the synthetic voice to the selected recipient or third party.

The present invention may, if desired, have a Dynamic Speed to Record Detector Range Converter in communication with the Automatic Speed Controlled Location Detection Module. The Dynamic Speed to Record Detector Range Converter has at least one range factor data structure relative to the speed of the vehicle. The range factor data structure transforms the navigational record into a look-ahead navigational record, whereby the Dynamic Speed to Record Detector Range Converter continuously communicates expected vehicle navigation position relative to the speed of the vehicle via the Data to Speech Translation Module. For example, when the vehicle approaches a street intersection the speed of the vehicle is ascertained and a -R-factor relative to that speed is appended to the approaching street intersection. When the vehicle is within a predetermined range or distance from the street intersection the Data to Speech Translation Module enunciates in a synthetic voice the name of the street intersection or any other desired denotation. The -R-factor is dynamic i.e., small values of -R- pertain to slower moving vehicles and larger values of -R- pertain to faster moving vehicles. With small values of -R-, street intersections immediately in range of the vehicle are enunciated. As the speed of the vehicle increase so does the -R- factor and range to the expected street intersection. For example, the higher the speed of the vehicle, such as on an Expressway, the larger the -R- factor, the more distant the expected street intersection is enunciated by the Data to Speech Translation Module. This allows for earlier Speech Notification of a pending Exit Ramp.

A Data to Speech Translation Module announces the approaching of a selected intersection location. The announced intersection location is derived, in part, from the look-ahead navigational record store in memory. The look-ahead navigational record is continuously or dynamically updated as the speed of the vehicle changes i.e., larger or smaller values of -R-.

The Real Time Dynamic Scanning Database Module has logic or data structures that select a database file to match the current navigational position to the derived navigational position via GPS Data to Base Code Translation Module. The logic or data structures that command and control the database file to match the current navigational position or projected position to the derived or projected navigational position are formulated into a plurality of modules. A Dynamic Vector Control Module comprising a plurality of sub modules. The sub modules are a Location Database Module, a GPS Search File Database Module, and a Location Comparator-Indicator Module. The Location Database Module, GPS Search File Database Module and the Location Comparator-Indicator Module create a dynamic, real-time longitude and latitude random access database tracking system.

When taken in conjunction with the accompanying drawings and the appended claims, other features and advantages of the present invention become apparent upon reading the following detailed description of embodiments of the invention.

BRIEF DESCRIPTION OF THE DRAWINGS

The invention is illustrated in the drawings in which like reference characters designate the same or similar parts throughout the figures of which:

FIG. 24 illustrates Table-1 delineating various combinations of degree size, rotation, and hemisphere.

DETAILED DESCRIPTION

Figure 1A:
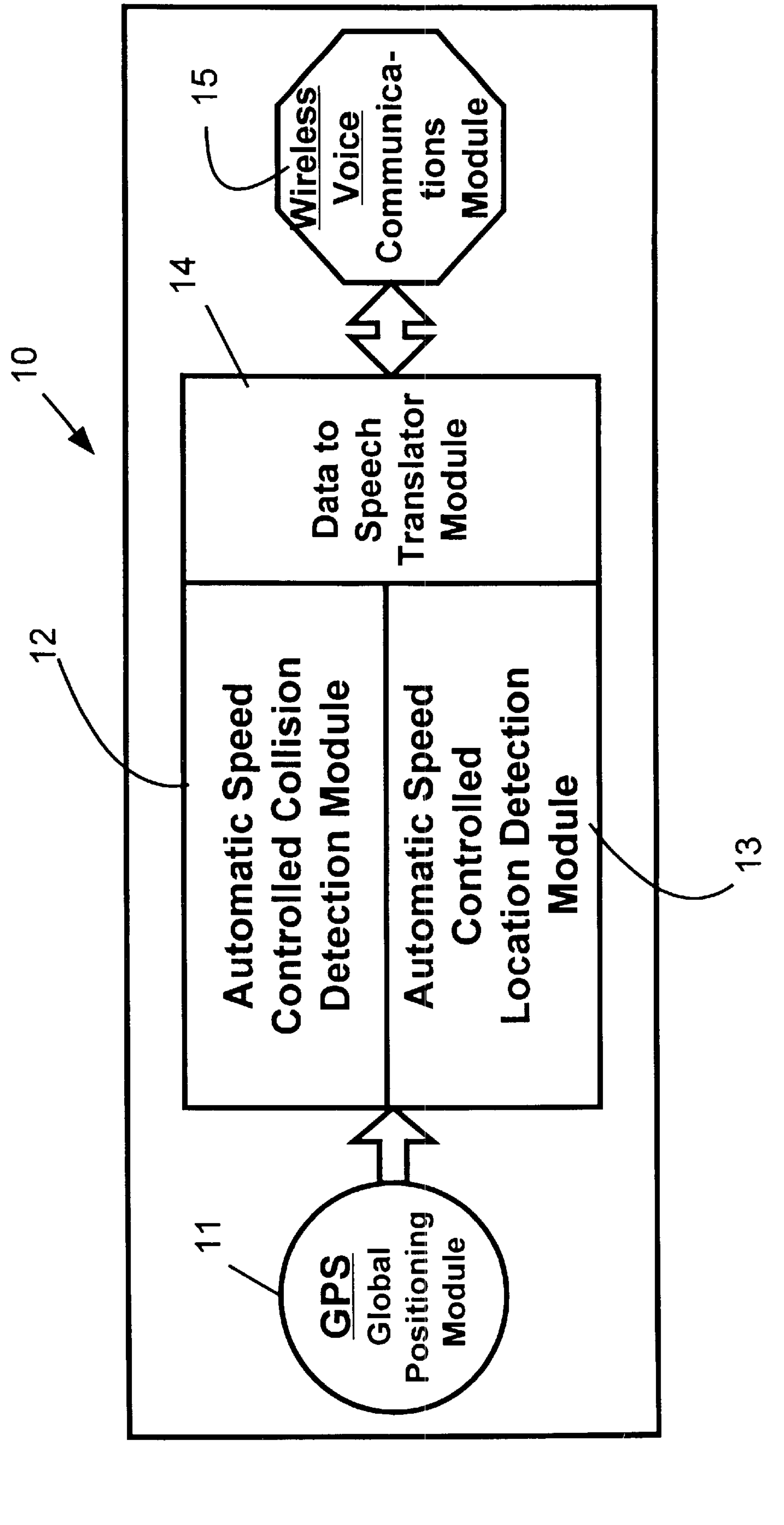
FIG. 1A illustrates a top level block diagram view of the preferred embodiment of the present invention.

The present invention 10, FIG. 1A is a Method and Apparatus for the Dynamic Vector Control of an Automatic Variable Range and Directional Reception of GPS Global Positioning signals, Dynamic Vehicle Tracking, Remote Notification of Collision and Synthetic Voice Data Communications. The Dynamic Vector Control Elements may, if desired, include Latitude, Longitude, Speed, Deceleration, Acceleration, Angular Direction, Latitude Corrected Distance, Adjustable Range, Database Control, and Initial Forces Compensation. The present invention 10 may, if desired, be installed in any type of vehicle. Examples of vehicles are automobiles, trucks, airplanes, or motorcycles. The installation of the present invention 10 may, if desired, be in any location on the vehicle that is available or known by those skilled in the art of installation of communication equipment on vehicles. The present invention 10 functions or operates in a totally hands-free and eye-free environment. Since the present invention 10 is automatic, no operator intervention or special requirements are placed on a user, driver, or occupant of the vehicle. The user may receive the benefit of the present invention 10 if physically impaired or otherwise incapacitated during pre-collision, collision, or post-collision of the vehicle with another vehicle or object.

The present invention 10, FIG. 1A has a plurality of functions. If desired the present invention 10 provides a positional location of the vehicle, automatic emergency transmittal of pertinent information during post-collision, silent monitoring of the vehicle from any remote location, wireless communication via any analog or digital type voice telecommunications system. The present invention 10 may further, if desired, provide the recording of pertinent information for local or remote synthetic voice retrieval, look-ahead range finding for expected vehicle position with off route location rejection, vehicle tracking from any remote telephone, in vehicle Real Time synthetic voice enunciation of navigation information such as Location, Speed and Direction and Local or Remote Retrieval of Accident Investigation information.

Figure 16:
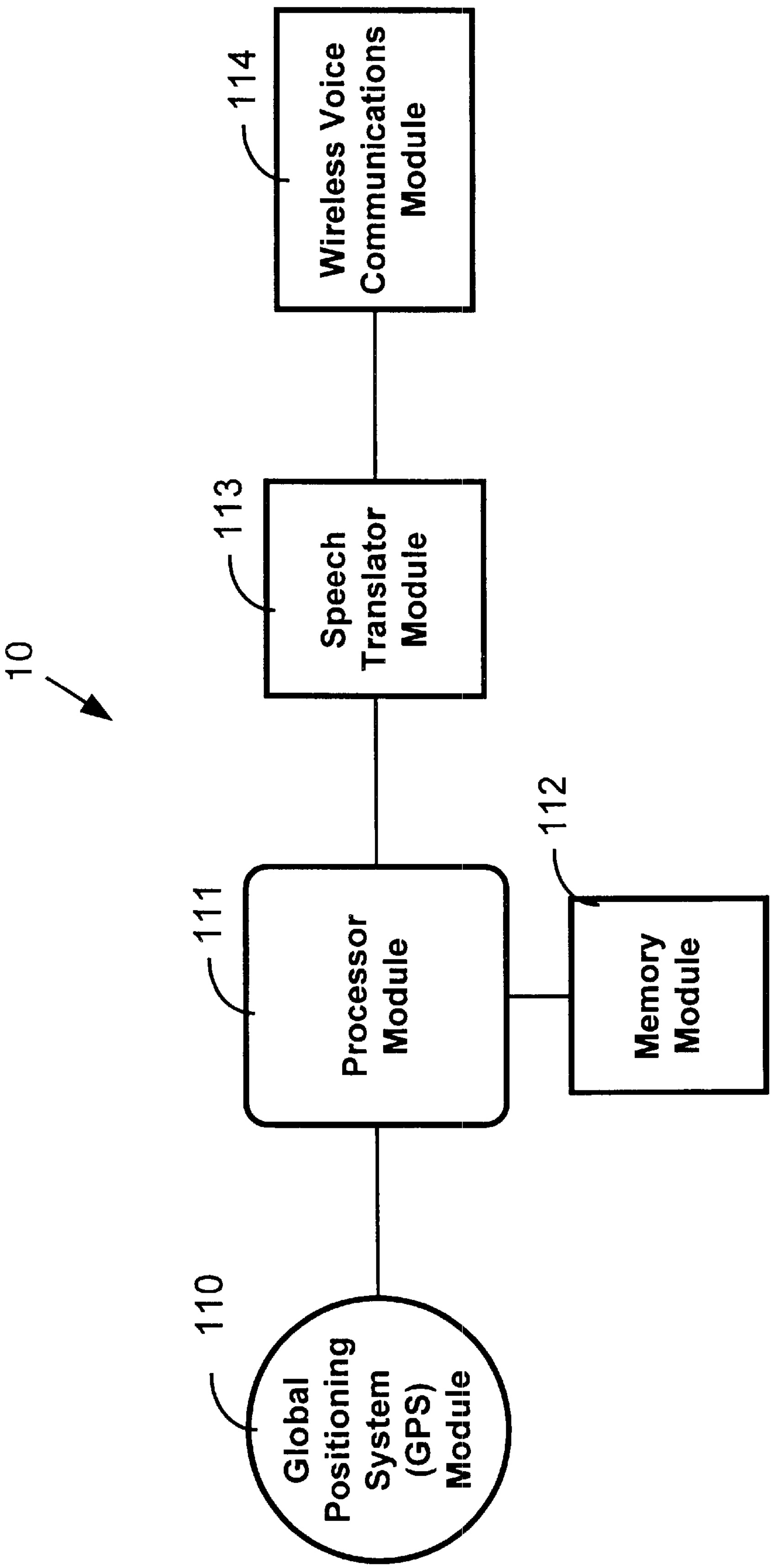
FIG. 16 illustrates a block diagram view of the hardware components of the present invention 10.

The present invention 10, FIG. 1A receives raw positional, directional, and timing data from a Global Positioning Receiver 110, FIG. 16 via a Global Positioning Software Module 11, FIG. 1A. The Global Positioning Module 11 selectively requests, restructures, and interprets navigational position and timing data for an Automatic Speed Controlled Collision Detection Module 12. The Automatic Speed Controlled Collision Detection Module 12 requests present or current vehicle location from an Automatic Speed Controlled Location Detection Module 13 via a Dynamic Vector Control Module 160. The Automatic Speed Controlled Location Detection Module 13 dynamically searches its databases or controller memory (delineated herein) for a match between selected data from the Global Positioning Module 11 and the dynamic location of the vehicle stored in its databases. After a selected period of time or when a match occurs, the Automatic Speed Controlled Location Detection Module 13 reports its findings to the Automatic Speed Controlled Collision Detection Module 12.

In parallel or sequentially the Automatic Speed Controlled Collision Detection Module 12 polls at least one collision detection sensor and determines if a collision has occurred within a selected time interval. If a collision has occurred, the present invention 10 stores in its memory all pertinent select Pre-collision and collision event information or data concerning the vehicle, location, direction, time, speed, and occupant attributes. A Data to Speech Translation Module 14 in communication with the Automatic Speed Controlled Collision Detection Module 12 receives selected data from the Automatic Speed Controlled Collision Detection Module 12. The Data to Speech Translation Module 14 translates the received selected data into any desired synthetic speech or language usable by any analog or digital wireless telephone. The Data to Speech Translation Module 14 generates selected tones and commands to communicate with an intended selected recipient or third party or third party wireless communication system.

A Wireless Voice Communications Module 15 in communication with the Data to Speech Translation Module 14 receives the translated selected tones, commands and Synthetic Voice for transmission to the recipient or third party. The Wireless Voice Communications Module 15 transmits, via wireless communication 20, FIG. 1B the selected translated data concerning the vehicle, location, or occupants to the selected recipient or third party in any selected language. The recipient or third party via wireless, landline, or other known in the art communication medium 21 receives the communiqué from the vehicle. The recipient or third party may, if desired, respond to the communication by notifying the appropriate emergency personnel or performing other selected activities. An example of another selected activity is silently polling or communicating with the vehicle to validate the occurrence of the collision. The polling or communication with the vehicle is not dependent on a response from the vehicle occupants or driver. The information requested from the vehicle may, if desired, be all or part of the stored information concerning any aspect of the collision, vehicle, vehicle location, or occupants of the vehicle.

Figure 1B:
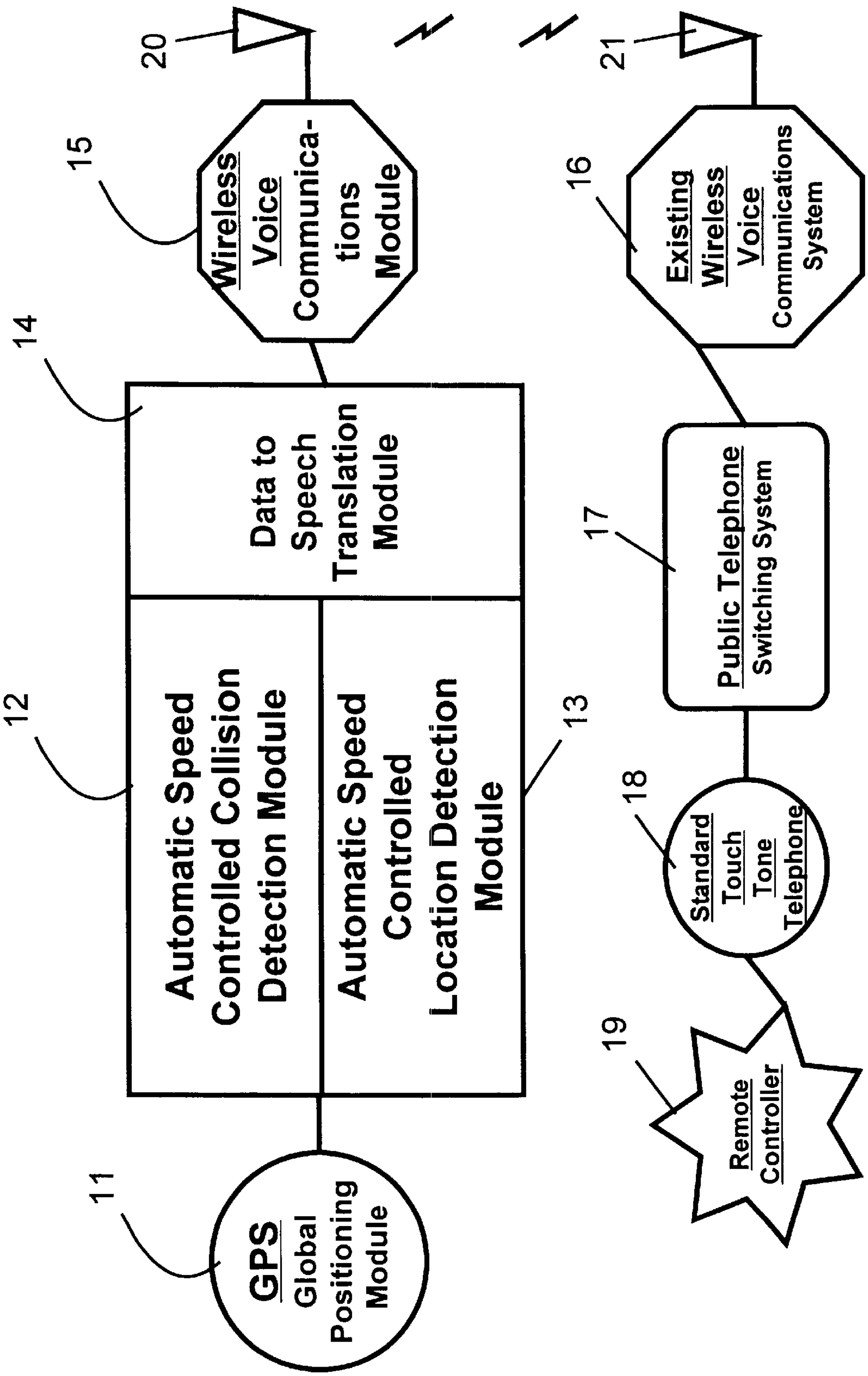
FIG. 1B illustrates a top level block diagram view of present invention of FIG. 1A in communication with a recipient or third party.

The Existing Wireless Voice Communications System 16, FIG. 1B may, if desired, be cellular technology based, satellite communication technology based, or any communication medium known to those skilled in the art of telecommunications. The Existing Wireless Voice Communications System 16 is connected to or in communication with a Public Telephone Switching System 17. The Public Telephone Switching System 17 provides the typical and known infrastructure to communicate with mobile or wireless transmission mediums. The Public Telephone Switching System 17 is in communication with a Standard Touch Tone Telephone 18. The Standard Touch Tone Telephone 18 may, if desired, be integral to a Remote Controller 19. The Remote Controller 19 may, if desired, be any communication facility capable of responding to incoming voice communication. Since the present invention 10 transmits synthetic voice, no dialogue is required by the recipient or third party at the remote facility. The recipient or third party need only respond to the commands provided by the data contained in the synthetic speech or interrogate the information stored in the vehicle using just a Touch Tone telephone.

Figure 7:
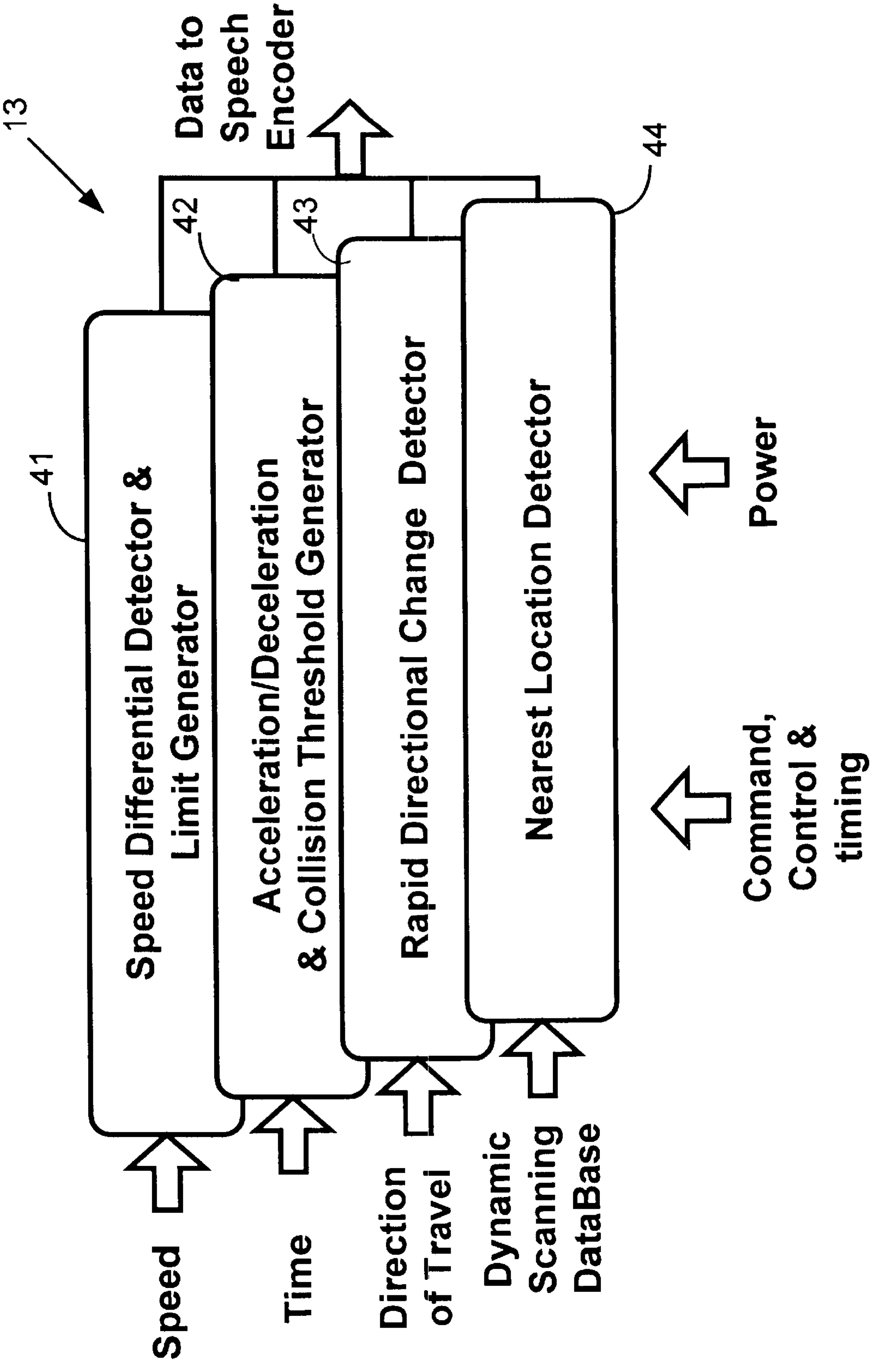
FIG. 7 illustrates a block diagram view of the Automatic Speed Controlled Collision Detection Module of FIG. 2.

The Automatic Speed Controlled Location Detection Module 13, FIG. 7 has logic or data structures to convert GPS speed (velocity) from kilometers per hour to miles per hour and feet per second via a speed differential detector and limit generator 41. The speed differential detector and limit generator 41 receives data from the Dynamic Scanning Database Module 25 and calculates the difference in speed of the vehicle between successive 1-second GPS data signals. This Speed Difference for each 1-second interval equates to Acceleration or Deceleration.

Figure 2:
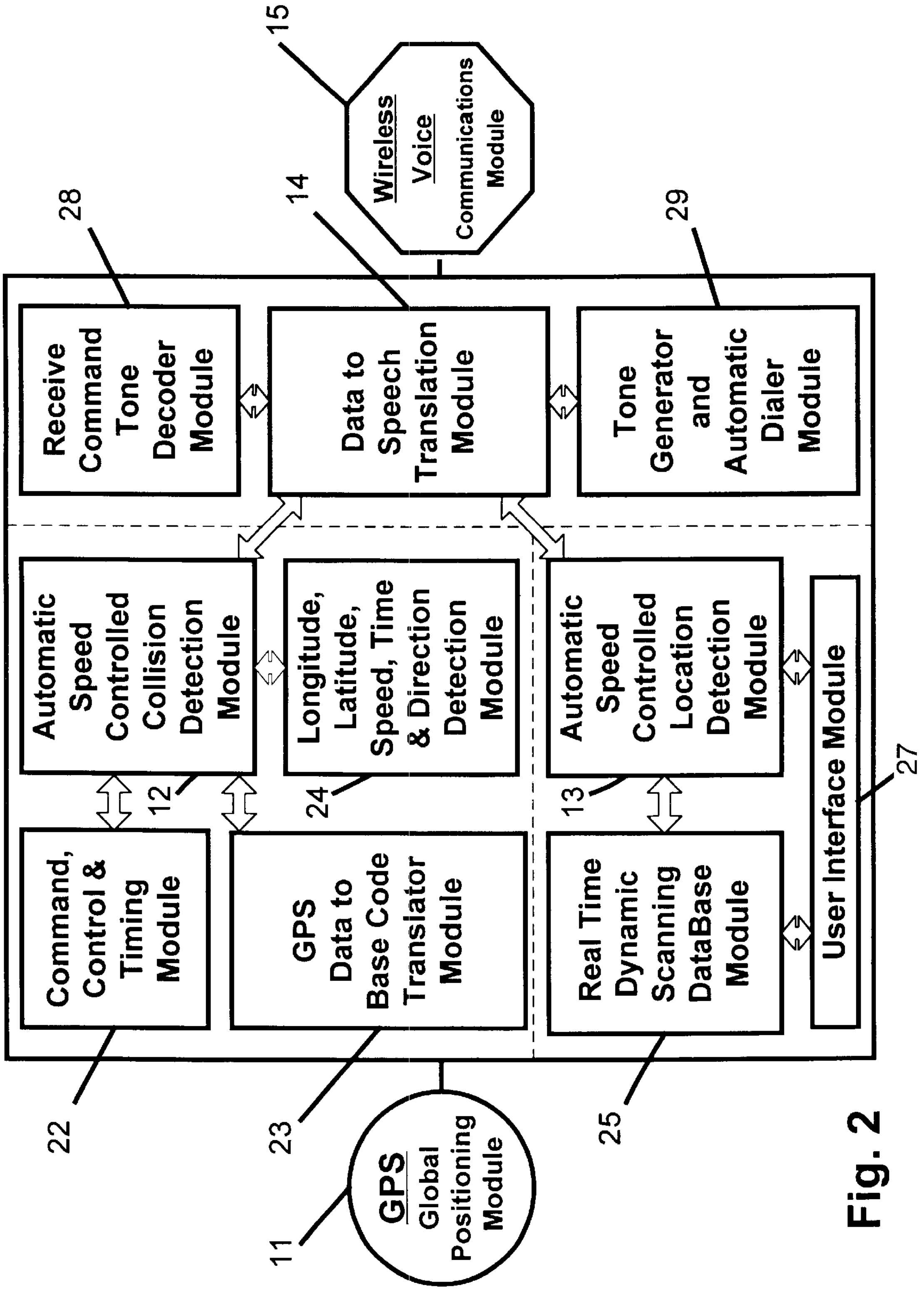
FIG. 2 illustrates a block diagram view of the present invention of FIG. 1A interactively communicating with its sub-modules.

An acceleration/deceleration and collision threshold generator 42 in communication with the Dynamic Scanning Database Module 25, FIG. 2 has logic or data structures that calculate acceleration/deceleration using data received from the speed differential detector and limit generator 41. The acceleration/deceleration and collision threshold generator 42 provides or calculates a dynamically selectable Collision Threshold value. Any Deceleration value greater than this Collision Threshold causes a vehicle collision to be reported. No collision is reported for Deceleration values below this collision Threshold Value. The selectable threshold level is dynamically controlled by the speed of the vehicle to compensate for the changes in the Inertial Forces of the vehicle with speed and its resulting changes in measured speed difference per second or acceleration/deceleration. Deceleration values are used to report vehicle front-end collisions while Acceleration values can be used to report rear end collisions.

To augment or enhance the determination of the selectable collision threshold Level Rapid Directional Change Detector 43 logic or data structure may, if desired, be implemented to compare the rate of change in the direction of travel of the vehicle to the speed of travel. The comparison is used to separate a "reasonable" directional change for a given speed, such as a vehicle turning versus a forced directional change such as a side or angular collision. Side impact and vehicle orientation sensors may also be employed.

In addition, a nearest location detector 44 logic or data structure determines or calculates the distance (range) and direction of the vehicle from the last known stored vehicle location. The conversion of distances between Latitude degrees to and equivalent True Distance is Linear. The conversion of Longitude degrees to True Distance is non-linear since the linear distance between longitudinal degrees decreases with increases in Latitude. So an appropriate non-linear Latitude dependent Longitude to True Distance conversion process is provided. The data output of the speed differential detector and limit generator 41, velocity and collision threshold generator 42, rapid directional change detector 43, and nearest location detector 44 are combined and transmitted to the Data to Speech Translation Module 14, FIG. 2 (discussed herein).

Figure 5:
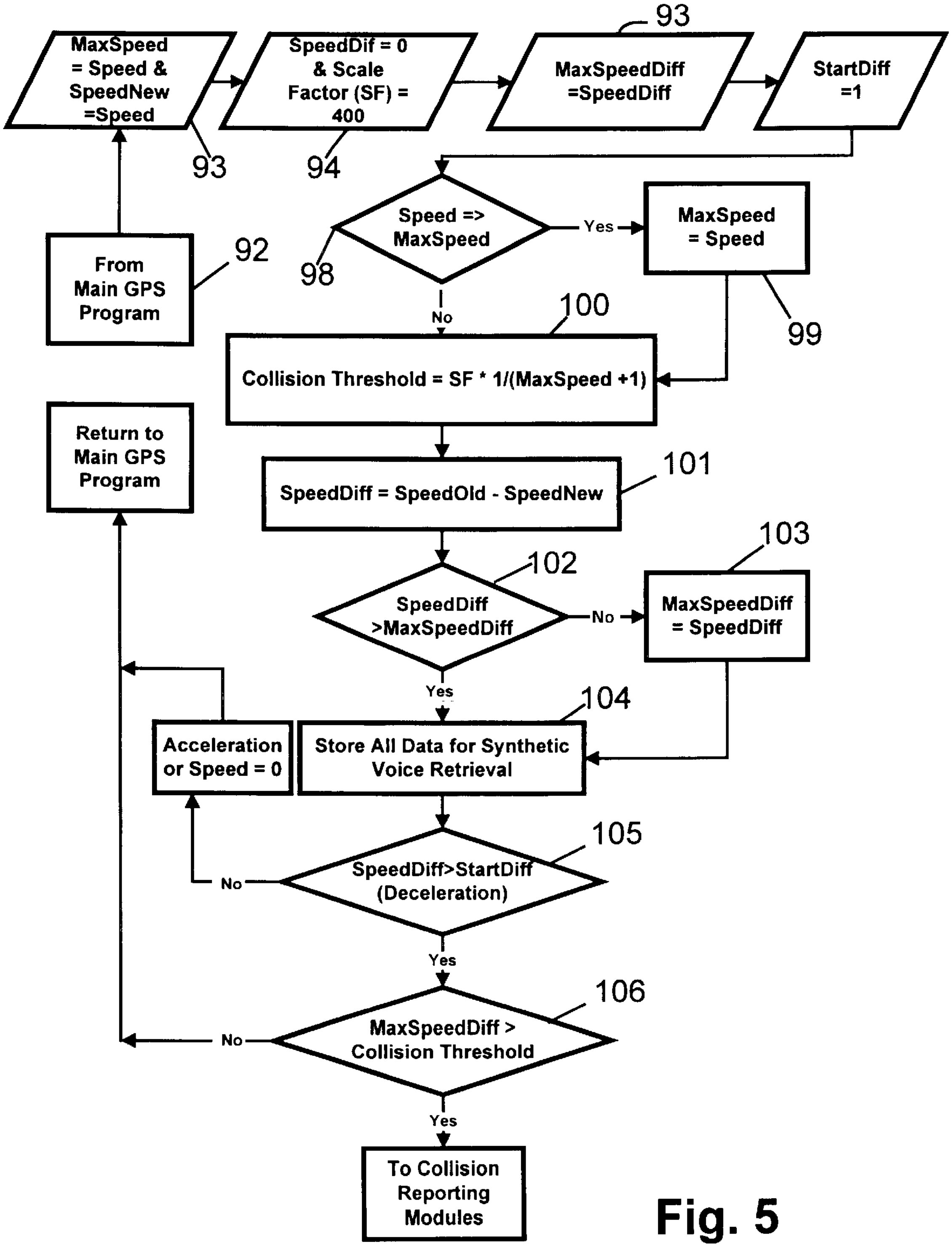
FIG. 5 illustrates a flow chart diagram view of the Automatic Speed Controlled Collision Detection Module of FIG. 2.

A logical flow of the determination of a collision 91, FIG. 5 by the Automatic Speed Controlled Collision Detection Module 12 begins with receiving base code data from the GPS Data to Base Code Translation Module 23, denoted at block 92, FIG. 5. With each receipt of new data from the GPS Data to Base Code Translation Module 23, the determination of whether a collision has occurred is initialized. The initialization begins when the maximum vehicle speed is equal to the vehicle speed generating a new vehicle speed 93. The speed differential is set to zero and a scale factor (SF) 94 is set to 400. The maximum vehicle speed differential is set to equal the vehicle speed differential 95. It has been empirically determined that 13 is a reasonable collision threshold value for a slow city/urban speed of 30-mph while 5.5 is a more appropriate value for a faster 70 mph highway speed. Solving equation 100 for the scale factor SF using these 2 sets of numbers yields an SF of about 400 under both speed conditions. The one added to Maxspeed in 100 adds little to the end result but removes the mathematical problem of division by zero if MaxSpeed equals zero.

If the speed of the vehicle is equal to or greater than the maximum speed 98, the maximum vehicle speed is made equal to the current vehicle speed 99 for use in the next 1-second system cycle. If the speed of the vehicle is less than the maximum 98, the collision threshold 100 is equal to scale factor multiplied by 1 divided by the maximum speed plus 1. The vehicle speed differential is equal to the stored value of speed i.e., old speed from 1 second earlier minus the newly derived vehicle speed 101.

If the vehicle speed differential is less than the maximum vehicle speed differential 102, the new deceleration is less than the old deceleration from 1 second earlier and the vehicle is slowing down at a slower rate. The maximum speed differential is then made equal to the new speed differential 103 for use during the next 1-second system cycle. If the vehicle speed differential is more than the maximum speed differential 102 the vehicle is slowing down at a faster rate indicating a possible collision in process. Thus, all current data is stored for synthetic voice retrieval 104. If the vehicle speed differential is greater than the start differential 105, deceleration of the vehicle has occurred. If the vehicle speed differential is less than the start differential 105, no deceleration of the vehicle has occurred and probably no collision has occurred. If the maximum vehicle speed differential is greater than the Collision threshold 106, a collision has occurred and the Automatic Speed Controlled Collision Detection Module 12 responds as discussed herein.

Figure 3:
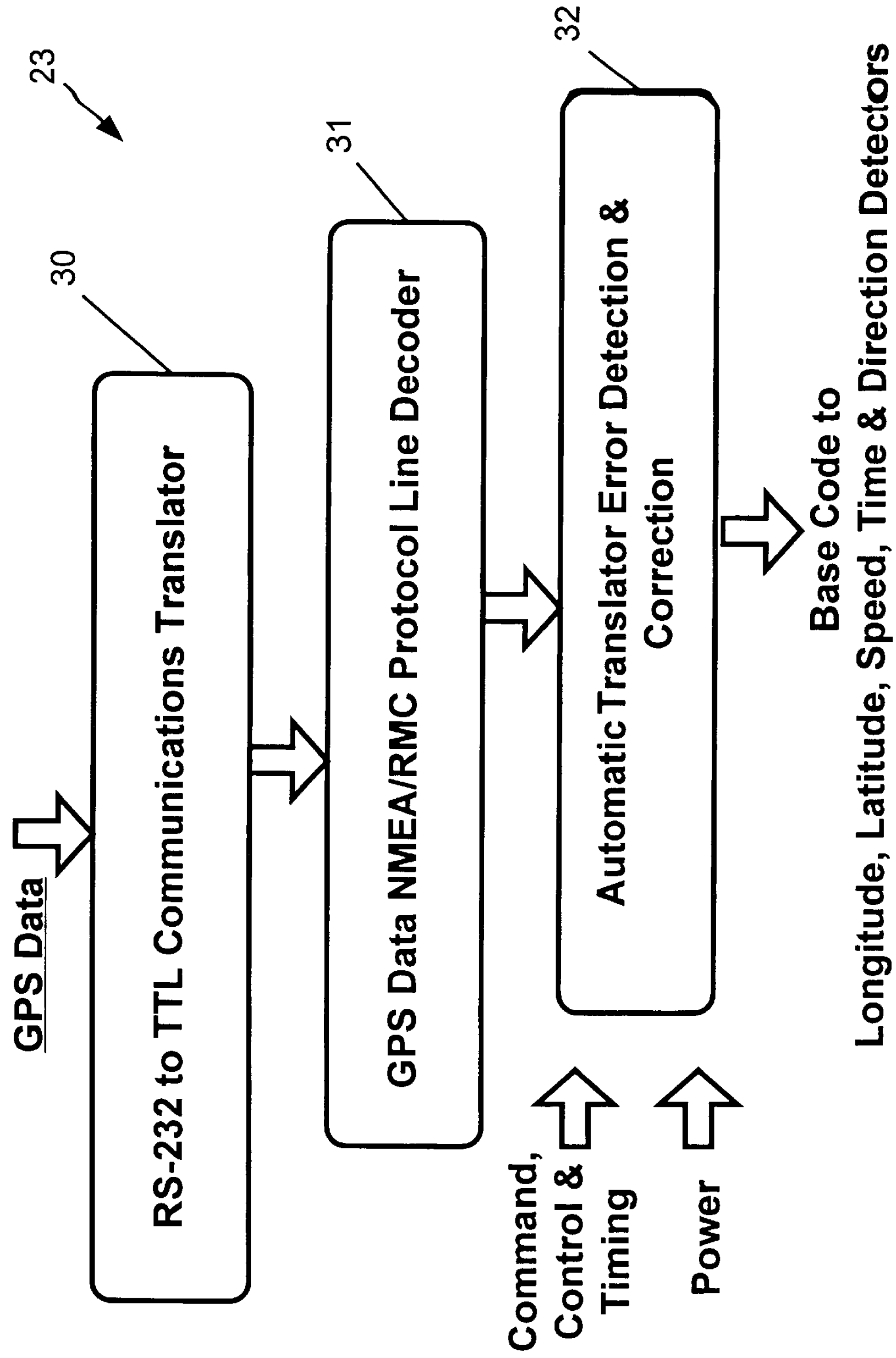
FIG. 3 illustrates a block diagram view of the GPS Data to Base Code Translation Module of FIG. 2.

The GPS Data to Base Code Translation Module 23 FIG. 3 is in continuous serial communication with the GPS receiver via a RS-232 cable. The GPS Data To Base Code Translation Module 23 has logic or data structures to facilitate the conversion and translation of raw data 30 received from the GPS receiver to a selected logic level that may be interpreted by any selected type of logical functions into navigational parameters. An example of a selected logical function is converting the serial data communication to TTL functional logic. The GPS Data to Base Code Translation Module 23 has logic or data structures to decode or extract 31 the RMC code from the received GPS data. The RMC code is the line of code containing the needed Navigation data and is extracted from the National Marine Electronic Association (NMEA) protocol Data packet being received from the GPS Module. The GPS Data to Base Code Translation Module 23 has logic or data structures to automatically detect any errors in the reception sequence of the RMC data. If an error is detected logic function 32 automatically corrects the error by resetting the RMC decode function and initiating a new decoding or extraction of RMC data. The data produced or resolved by the GPS Data to Base Code Translation Module 23 is base code data containing navigational parameters.

Figure 4:
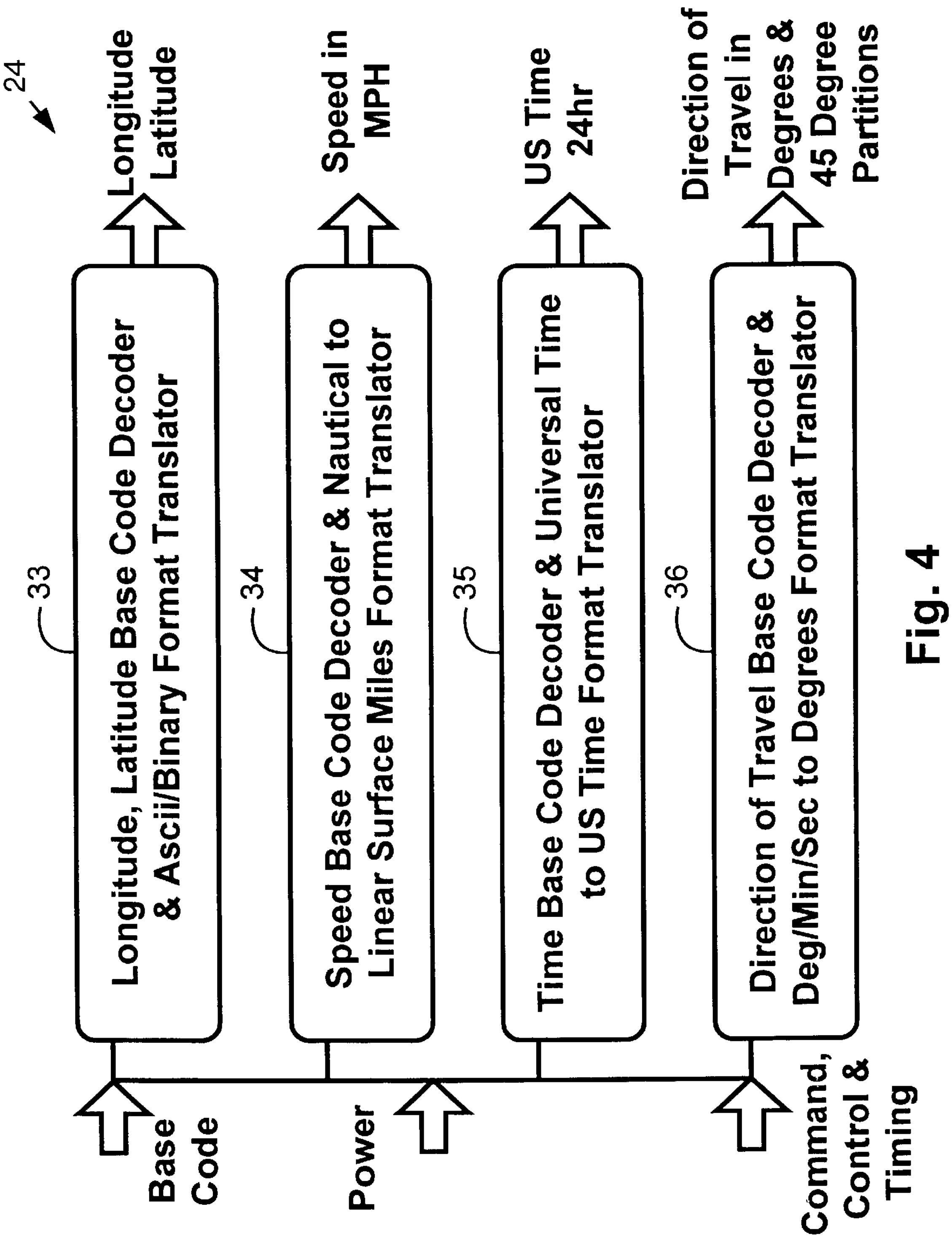
FIG. 4 illustrates a block diagram view of the Longitude, Latitude, Speed, Time, and Direction Detection Module of FIG. 2.

The Longitude, Speed, Time and Direction Detection Module 24 FIG. 4 has logic or data structures to extract from or transform the base code data pertaining to the real time position, speed, time, and direction of the vehicle. The Longitudinal, Latitude, Base Code Decoder and ASCII/BINARY format Translation 33 logic or data structure decodes or transforms the received GPS positional data from ASCII to a binary format for logical processing by the present invention 10. The Speed Base Code Decoder and Nautical to Linear miles format Translation 34 logic or data structure decodes or transforms the received base code and dynamically translates it from nautical knots to miles per hour.

The time base data decoder and universal time to United States (US) time 35 logic or data structure decodes or transforms the received base code into 24-hour based US time. The navigational direction of travel base code decoder and degree/minute/second to degrees format Translation 36 logic or data structure decodes or transforms the received base code into 360-degrees of the direction of travel of the vehicle. The 360-degree direction of travel is further partitioned into eight segments of 45-degrees each to provide a general direction of travel function. These segments may, if desired, be labeled north, northeast, east, etc. and stored in memory as text for the Data To Speech Translation Module 14 to enunciate either locally, i.e., in the vehicle or remotely to the recipient or third party. A Virtual Directional Global Positioning System (GPS) Narrow Angle Antenna is further provided by subdividing the 360-degrees into smaller segments having a number of degrees dynamically controlled by the speed of the vehicle. The higher the speed, the fewer the degrees in the reception angle of the Virtual Antenna in order to compensate for the larger R-value range increase. When pointed in the direction of travel, this Virtual Antenna provides a “dead reckoning” function. This Virtual Directional Antenna may also be dynamically rotated with variable reception angles for use as a Direction and Distance Range Finder for select locations from feet to miles away.

The Command, Control and Timing Module 22, FIG. 2 provides the command, control, and timing of events of the present invention 10. The Command, Control and Timing Module 22 coordinates all data inputs, outputs, and conflict resolution between event priorities of the present invention 10. For example, the Command, Control and Timing Module 22 receive either manual or automatic activation commands and function switching commands from the (to be discussed) Tone generator and Automatic Dialer Module 29. The Command, Control and Timing Module 22 integrates these commands or functions into the operation of the present invention 10 in concert with receiving timing signals from the Global Positioning Module 11. The resultant timing function coordinates the activities of vehicle events. The vehicle events are defined as data accumulation of activities with respect to attributes of the vehicle, the driver or occupants, time of day, speed, location, or collision of the vehicle.

Figure 6:
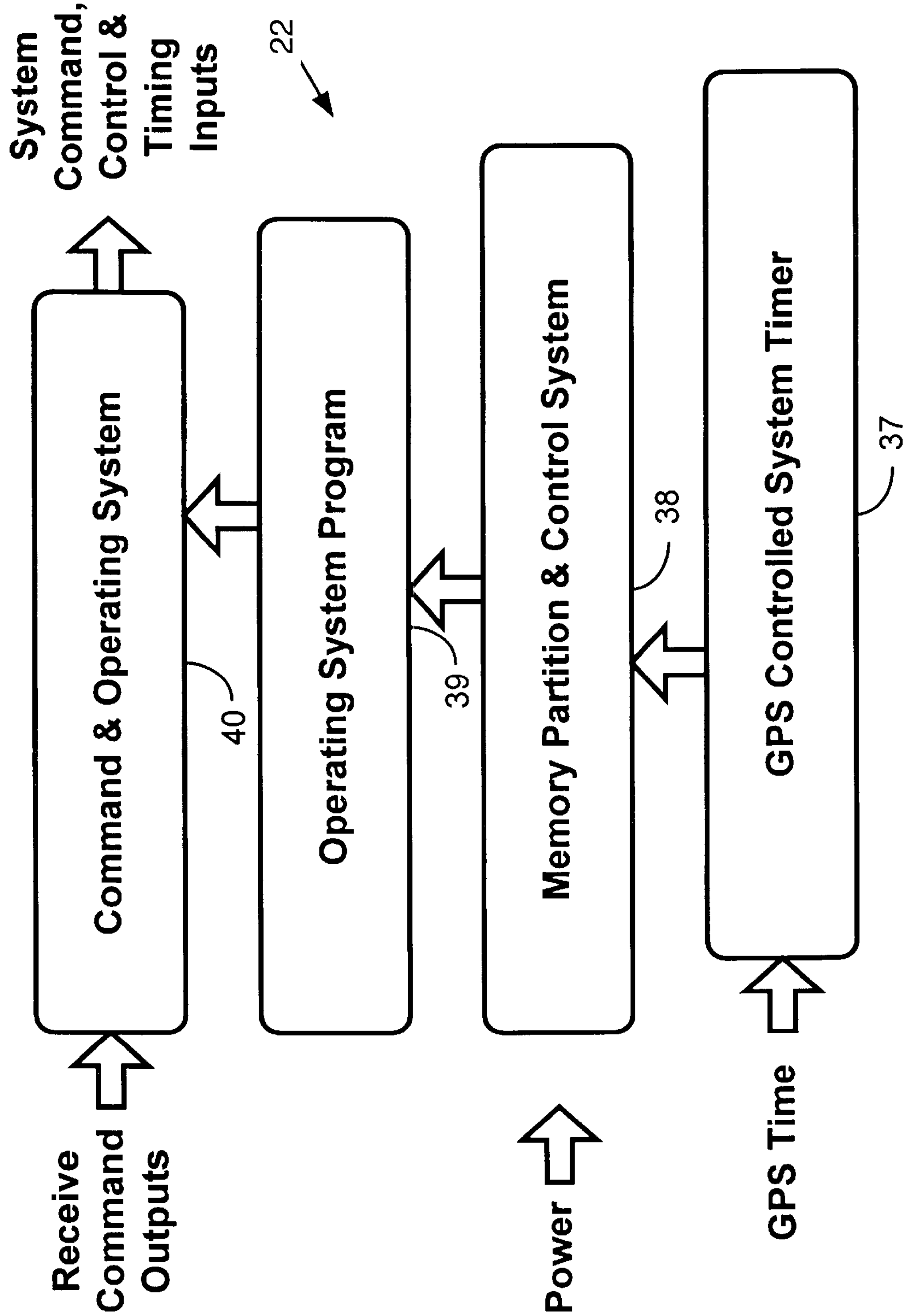
FIG. 6 illustrates a block diagram view of the Command, Control, and Timing Module of FIG. 2.

The Command, Control and Timing Module 22, FIG. 6 has logic or data structures to receive a selected repetition rate or signal from the Global Positioning Module 11 and creates a clocking system 37 to synchronize all modules, sub-modules, and switching functions of the present invention 10. The received repetition rate or signal may, if desired, be in the range of about 0.5-seconds to about 2-seconds. Preferably, the received repetition rate or signal is 1-second. A memory partition and control system 38 receives timing data from the GPS controlled system timer 37. The memory partition and control system 38 logic or data structure formulates or allocates memory partitions for temporary and memory stored data and may, if desired, archive selected file types. An operating system program 39 in communication with the memory petition and control system 38 has logic or data structures to coordinate and facilitate all system level processing functions for the present invention 10. A command and operating system 40 in communication with the operating system program 39 has logic or data structures to interpret local or manual activation commands from the user or driver of the vehicle or remotely from a recipient or third party via wireless communication and select received telephone tones.

Figure 10A:
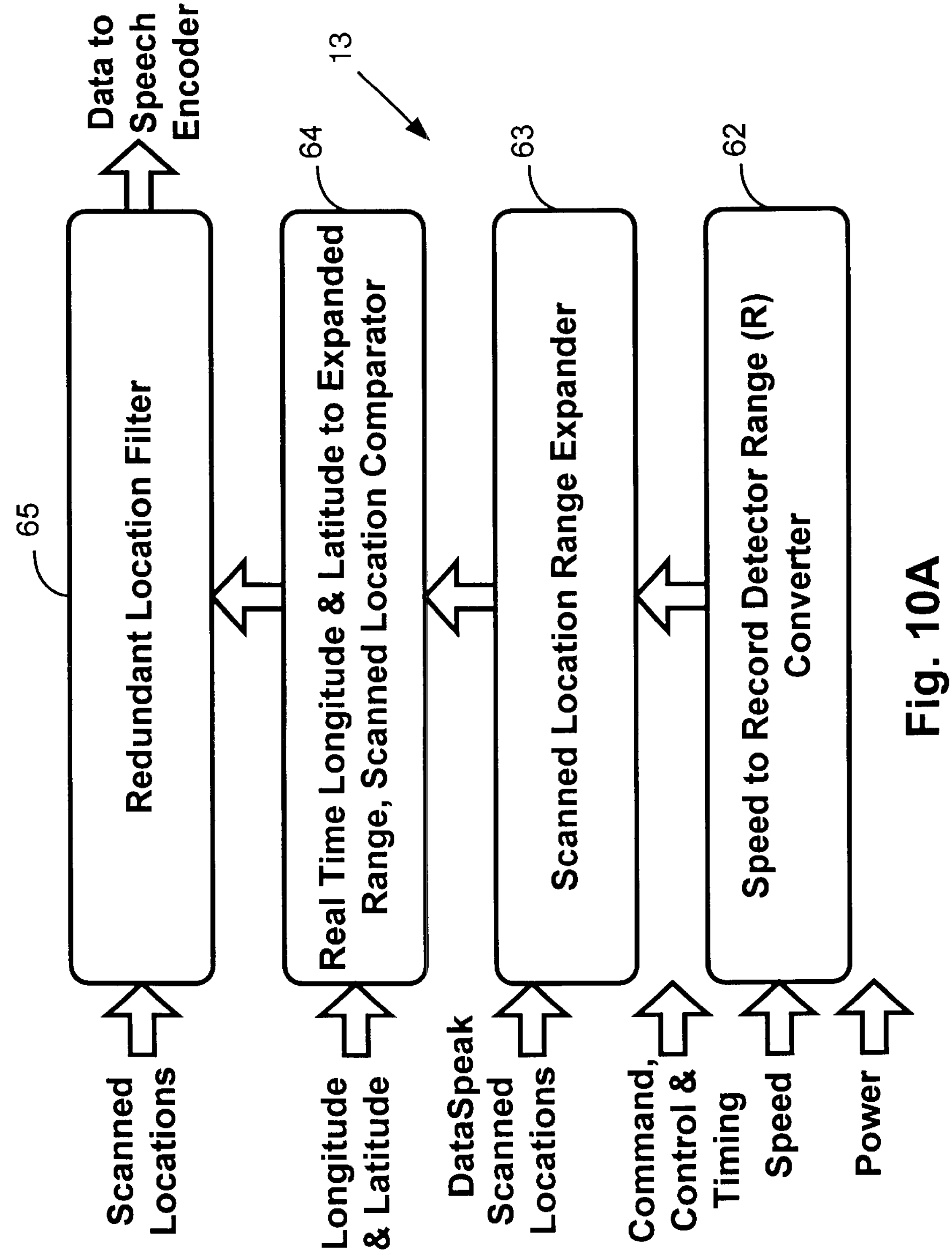
FIG. 10A illustrates a block diagram view of the Automatic Speed Controlled Location Detection Module of FIG. 2

The Automatic Speed Controlled Location Detection Module 13, FIG. 2 may, if desired, be in interactive communication with a Real Time Dynamic Scanning Database Module 25 and a User Interface Module 27. The Automatic Speed Controlled Location Detection Module 13, FIG. 10A has logic or data structures for determining a range (R) factor. The range factor enables the synthetic voice enunciation from the Data to Speech Translation Module 14 to announce the approaching of a selected intersection location. A Speed to Record Detector Range (R) Converter 62 dynamically converts the range to the selected intersection into selected values with respect to the speed of the vehicle i.e., smaller R-values for slower traveling vehicles and larger R-values for faster traveling vehicles. Linear Range between two locations begins by calculating the difference in Latitude and Longitude values between those two locations. Trigonometric equations are used to convert differential degree angles to distances. Since linear distances between Longitude degrees change with Latitude, a Latitude/Longitude Correction Factor may, if desired, be included with the Speed factor in order to create a True Linear measurement of distance to yield a correct calculation of the Range Value (R). A scanned location range expander 63 logic or data structure adds the dynamic range R-value to each location record in the matched sub-file and the two sub-files to be scanned, (as discussed herein). An alternate approach is to add the R-values to the Latitude and Longitude values of the translated, current incoming Global Positioning data.

A real time longitudinal and latitude to expanded range and scanned location comparator 64 logic or data structure compares the expanded range R-value location records in the match sub-file to the real time current vehicle location.

When a record match is found having values of latitude and longitude that the current latitude and longitude values fall within, a location match has occurred. If the initial vehicle position is borderline between the two sub-files and it has passed from one to the other during the matching process, the system then scans the two additional sub-files for a matching record. If no match is found, the Real Time Dynamic Scanning Database Module 25, FIG. 2 starts over following a 1 second time period and a request for new GPS data input from the Global Positioning Module 11. A redundant location filter 65 logic or data structure compares the newly matched location to the previous match location. If the two are the same, the new location is filtered out and the information or data sent to the speech encoder for local and remote enunciation is not sent again.

Figure 10B:
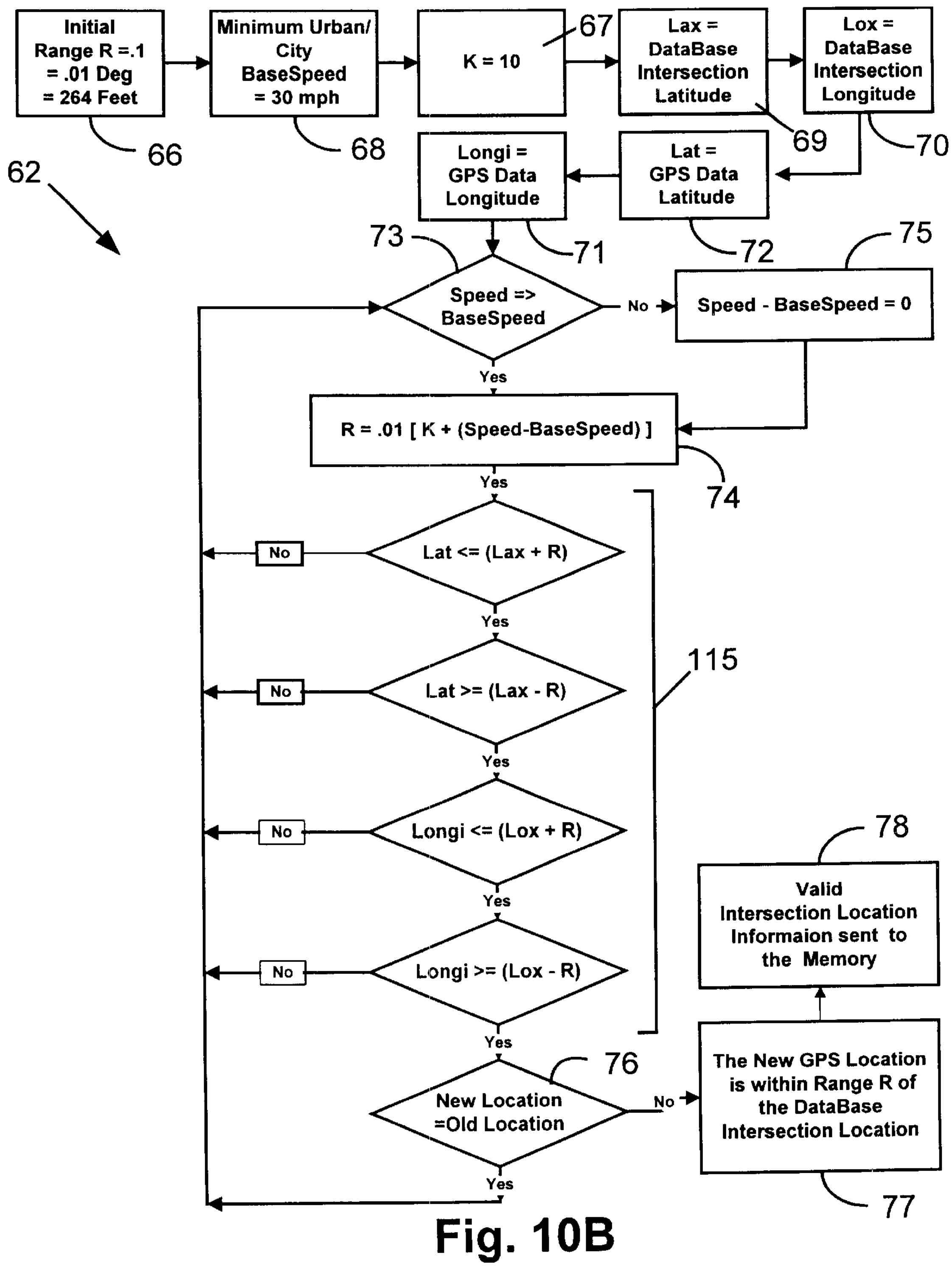
FIG. 10B illustrates a flow chart view of The Automatic Speed Controlled Location Comparator Module of FIG. 10A.

A logical flow diagram of the speed to record detector range (R) converter 62, FIG. 10B begins with an empirically derived initial range R-value 66 equal to a selected value. This value is determined from the fact that in Mid USA 0.01 degree of nautical distance is about 264 feet of surface distance 264 feet is a reasonable Intersection Detection Range for a slow moving vehicle with a Base Speed of about 30 mph in an Urban/City environment. An Initial/Minimum R value of 0.1 corresponds to this minimum Range of 264 feet. Determination of the R-values for various speeds has been empirically measured by comparing various types of vehicles including their mass and Inertial Energy effects. Alternate values of initial and operating w values for R and Minimum Base Speed may be appropriate for different vehicle types and specific applications. Given a Base Speed of 30 mph and a desired R of 0.1, solving for constant K in equation 74 yields K=10. Using this same value of K=10 and selecting a highway speed of 70 mph and keeping the base speed of 30 mph gives an R value of 0.5 for an Intersection Location Range of 1320 feet or ¼ mile. The stored vehicle intersection latitude location 69 and the stored vehicle longitude location 70 are retrieved from the database. The real time latitude 72 and the real time longitude 71 are received from the GPS Data to Base Code Translation Module 23. The current speed of the vehicle is determined and compared to the Base Speed.

If the current speed of the vehicle is greater than the Base Speed 73, the new R-value 74 is equal to the current speed minus the Base Speed plus K=10, multiplied by 0.01. If the current speed of the vehicle is less than the Base Speed the new R-value 74 is equal to K=10, multiplied by 0.01. Speed minus BaseSpeed 75 is made equal to zero to avoid negative values of R. The longitude and latitude 115 are resolved in relation to the R-value. The new location of the vehicle is determined from the newly derived longitude and the latitude data database values having -R- included. The new location of the vehicle is compared to the most recent location of the vehicle 76. If the new location is equal to the previous location, the present invention 10 determines that the vehicle has not moved to a new location and updating is not required. If the new location is not equal to the previous location, the new GPS location is within the range of the R-value of the database intersection location 77. The valid intersection location information or data is sent to the Automatic Speed Controlled Location Detection Module 13 for further processing 78.

Figure 8:
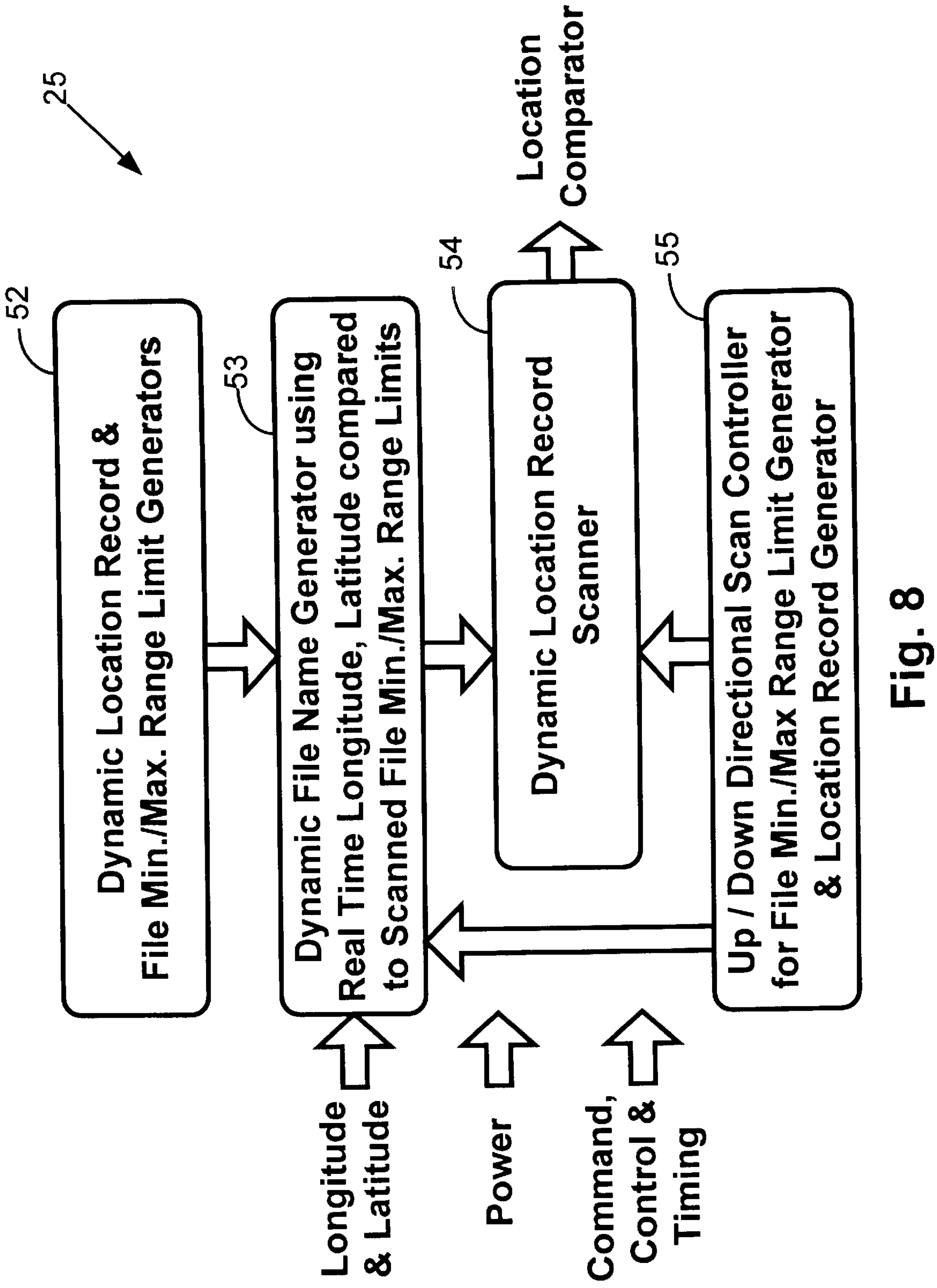
FIG. 8 illustrates a block diagram view of the Real Time Dynamic Scanning Database Module of FIG. 2.

The Real Time Dynamic Scanning Database Module 25, FIG. 8 has logic or data structures that select a database file to match the current position derived from the GPS Data to Base Code Translation Module 23. A dynamic location record and file minimum or maximum range limit 52 controls the selection process. The dynamic location record and file minimum or maximum range limit generator 52 splits a master location database file into smaller sub-files with each containing a selectable number of location records. The size of the sub-files is dependent on the overall size of the memory and processing speed of the controller implementing the present invention 10. The range limit generator then measures the minimum or maximum range in concert with the latitude/longitude values of all the records contained in each sub-file and attaches these values to the end of that file. A dynamic file name generator 53 scans the added record in each of the sub-files comparing the minimum and maximum location values to the real time current latitude and longitudinal values. A match sub-file occurs when a sub-file is found which has minimum and maximum location values that enclose the current latitude and longitude. That sub-file is then selected for further processing and assigned a new file name. A dynamic location record scanner 54 searches for that selected matched sub-file and transmits the data contained in that file to the Automatic Speed Controlled Location Detection Module 13. An up/down directional scan controller 55 has logic or data structures that cause the dynamic file name generator 53 to select and name two additional sub-files. One has the minimum and maximum location values one level above and the other has one level below those values determined during the matched sub-file processing. The up/down directional scan controller 55 also causes the dynamic location record scanner 54 to transmit these additional two sub-files to the Automatic Speed Controlled Location Detection Module 13.

Figure 9:
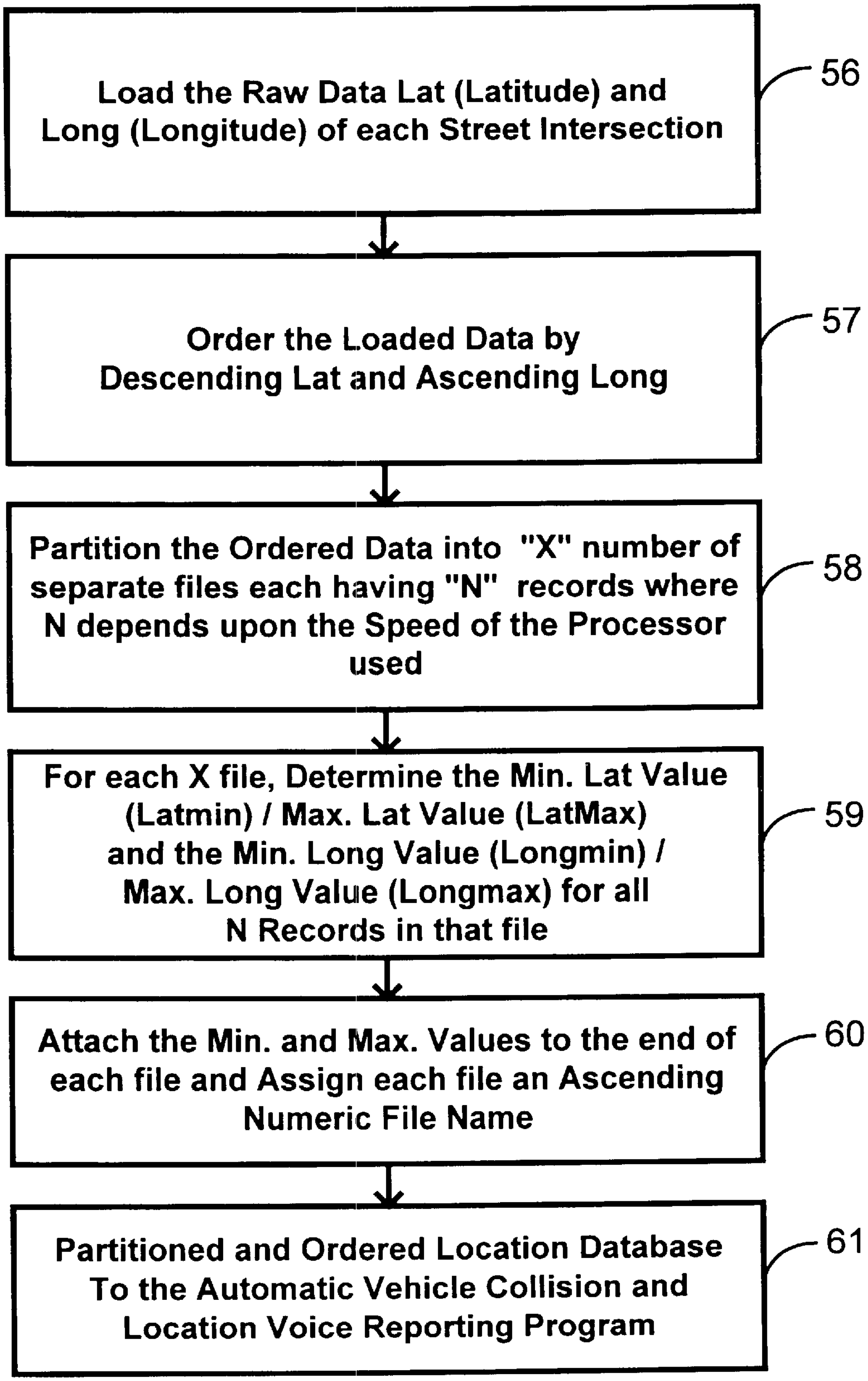
FIG. 9 illustrates a flow chart view of the location database partitioning and ordering functions.

A logical data flow of the above-discussed Real Time Dynamic Scanning Database Module 25, FIG. 9 begins with loading the raw latitude and longitude data of each street location 56. The loaded data is ordered by descending latitude and ascending longitude 57. The database is partitioned into a selected number of "X" files each having a selected "N" number of records 58. The "N" number is dependent upon the processing speed of the computer or controller implementing the present invention 10. For each "X" file the minimum latitude value, maximum latitude value, minimum longitude value and maximum longitude value is determined 59 for all "N" records in that file. The determined minimum and maximum values are attached 60 to the end of each file and each is assigned an ascending numeric file name. The files are then transmitted to the Automatic Vehicle Collision and Location Detection Module 13 for further processing 61.

Figure 11:
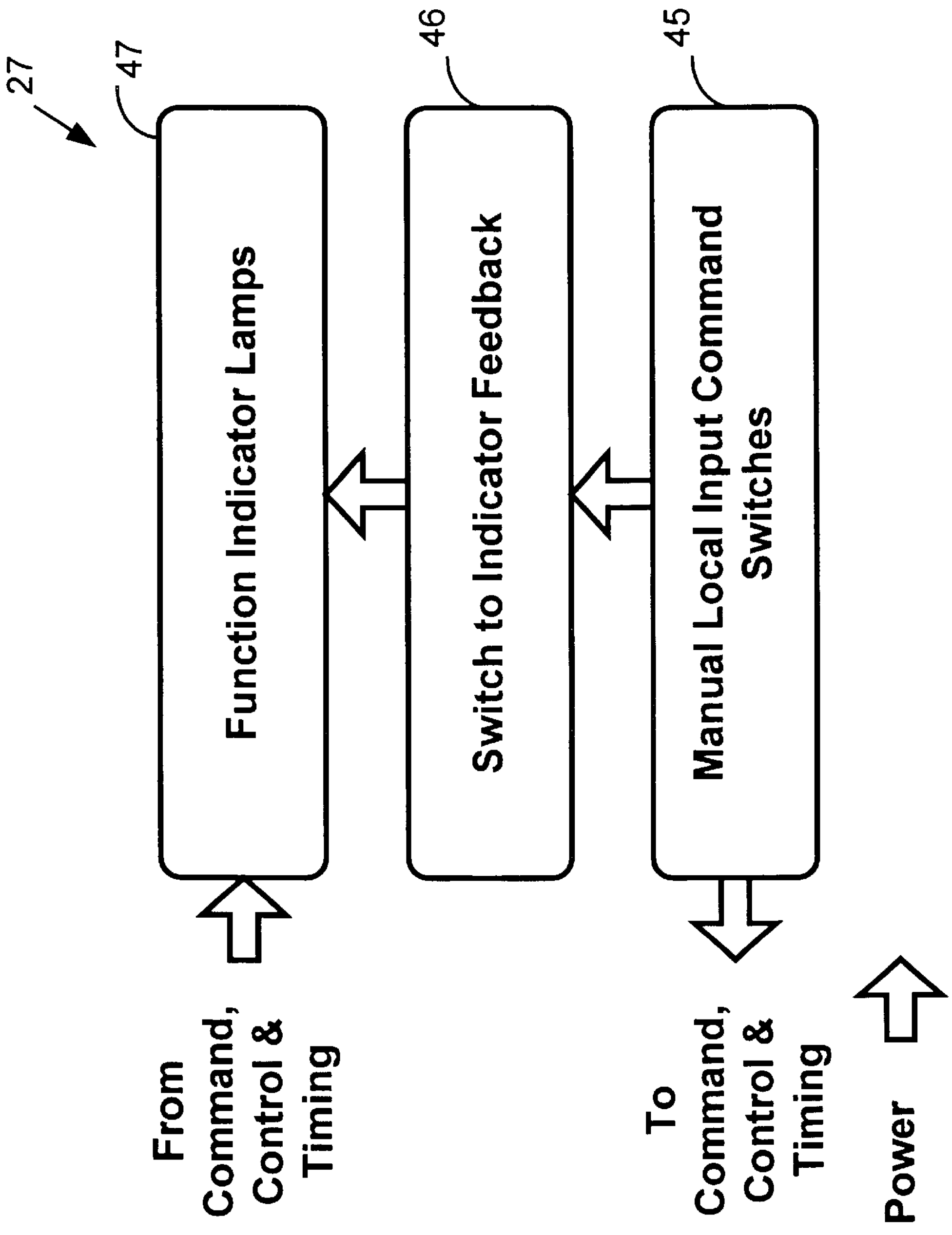
FIG. 11 illustrates a block diagram view of the User Interfaced Module of FIG. 2.

The User Interface Module 27, FIG. 2 has logic or data structures 45, 46, and 47 FIG. 11 that permit the present invention 10 to be activated, if desired, in the manual mode. A manual local input command switch 45 receives a command or commands from the user to operate in the manual mode. If the manual mode is activated, the present invention 10 sends any select or all stored information concerning the vehicle and its occupants to the Data To Speech Translation Module 14 for transmission to a recipient or third party. When this function is activated via a switch to indicator feedback 46, a select control function indicator lamp(s) 47 is activated. For example, the function indicator lamp(s) are illuminated when the system is switched to the manual mode and a selected message is activated for output. Additional function indicator lamp(s) 47 provide visual indication of system operation such as applied power and input/output data flow for remote retrieval and system diagnostics.

Figure 12:
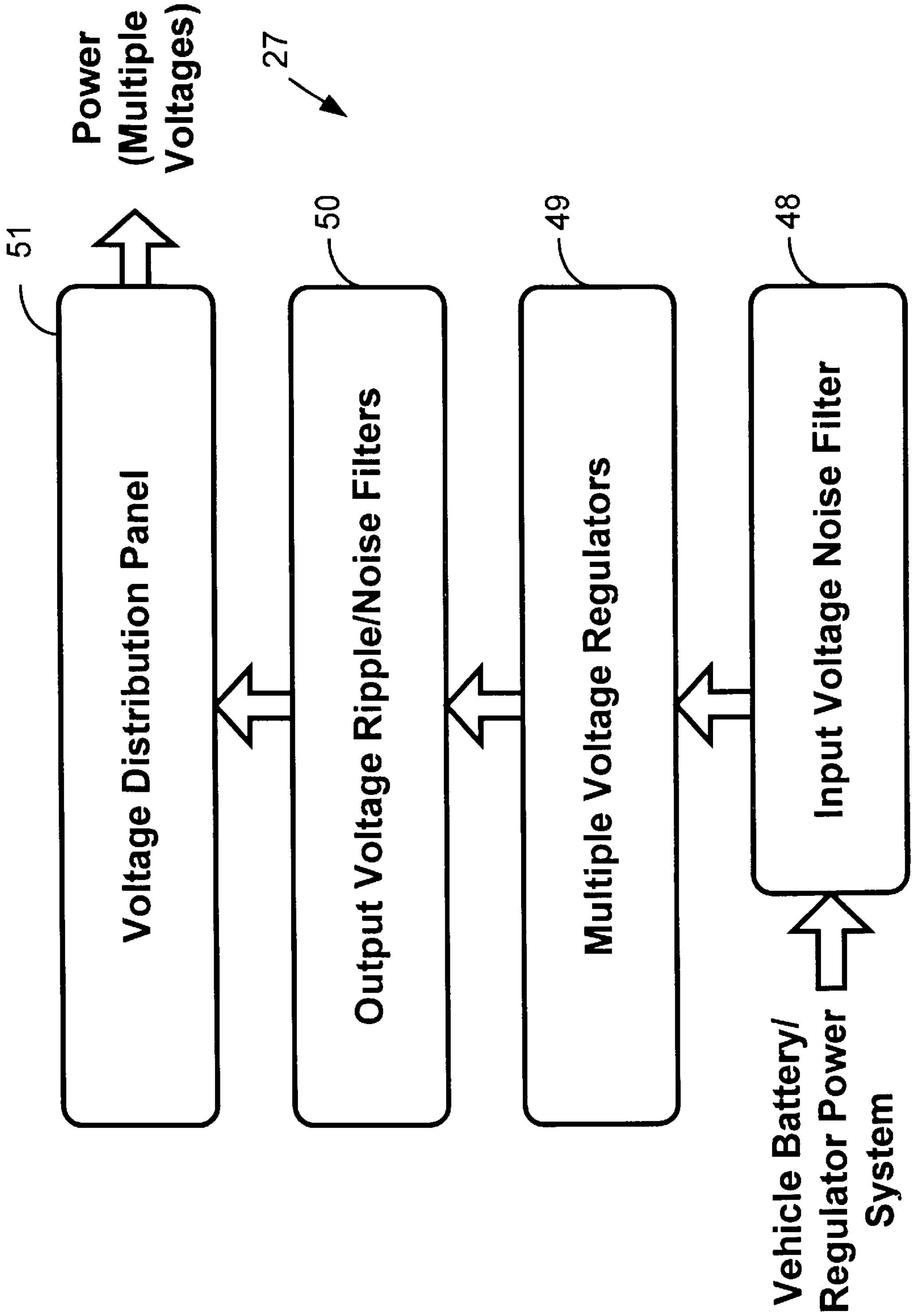
FIG. 12 illustrates a block diagram view of the Power System of the present invention.

The User Interface Module 27, FIG. 12 also provides logic or data structures to command and control an input voltage noise filter 48. The input voltage noise filter 48 controls or removes the electrical signal noise emanating from noise sources. Examples of noise sources are the applied power sources i.e., batteries, regulators, and the vehicle ignition system. The User Interface Module 27 contains multiple voltage regulators 49 to provide the present invention 10 with various system power level requirements. An output voltage ripple/noise filter 50 removes the power supply ripple and regulator noise from each of the different voltage level outputs. A voltage distribution panel 51 provides power to each of the modules or sub-modules that are connected to the present invention 10.

Figure 13:
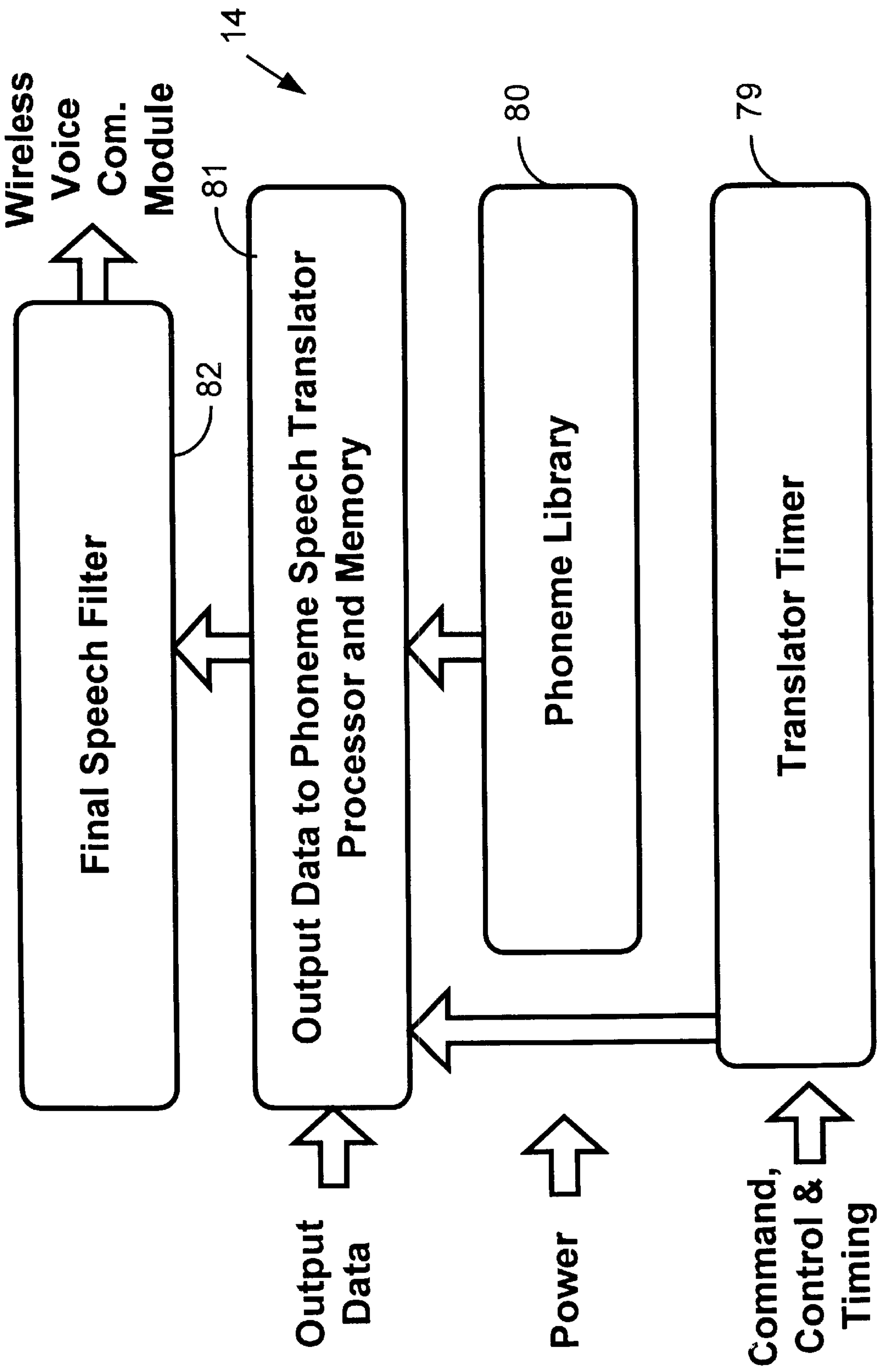
FIG. 13 illustrates a block diagram view of the Data to Speech Translation Module of FIG. 2.

The Data to Speech Translation Module 14, FIG. 2 may, if desired, be in interactive communication with a Tone Generator and Automatic Dialer Module 29, a Receiver Command Tone Decoder Module 28, and the Wireless Voice Communications Module 15. The Data to Speech Translation Module 14, FIG. 13 has logic or data structures for verifying and regulating the timing function of the transmissions of the location and collision data with respect to the GPS data via a Translation timer 79. The Data to Speech Translation Module 14 further has logic or data structures that command and control a phoneme library 80 containing all synthetic voice utterances and rules of speech in data or digital form. An output data to phoneme speech Translation 81 receives the combined data from the data output of the speed differential detector and limit generator 41, velocity and collision threshold generator 42, rapid directional change detector 43, and nearest location detector 44. The output data to phoneme speech Translation 81 translates the incoming information, data, or text to synthetic speech by matching the letters, words, and context of the text to contents of the phoneme library 80 and then outputs a digital or synthetic representation of a voice. A final speech filter 82 filters out time gaps and processing noise in the digital synthetic speech. The final speech filter 82 creates a close approximation of a true analog voice suitable for wireless communication to a recipient or third party.

Figure 14:
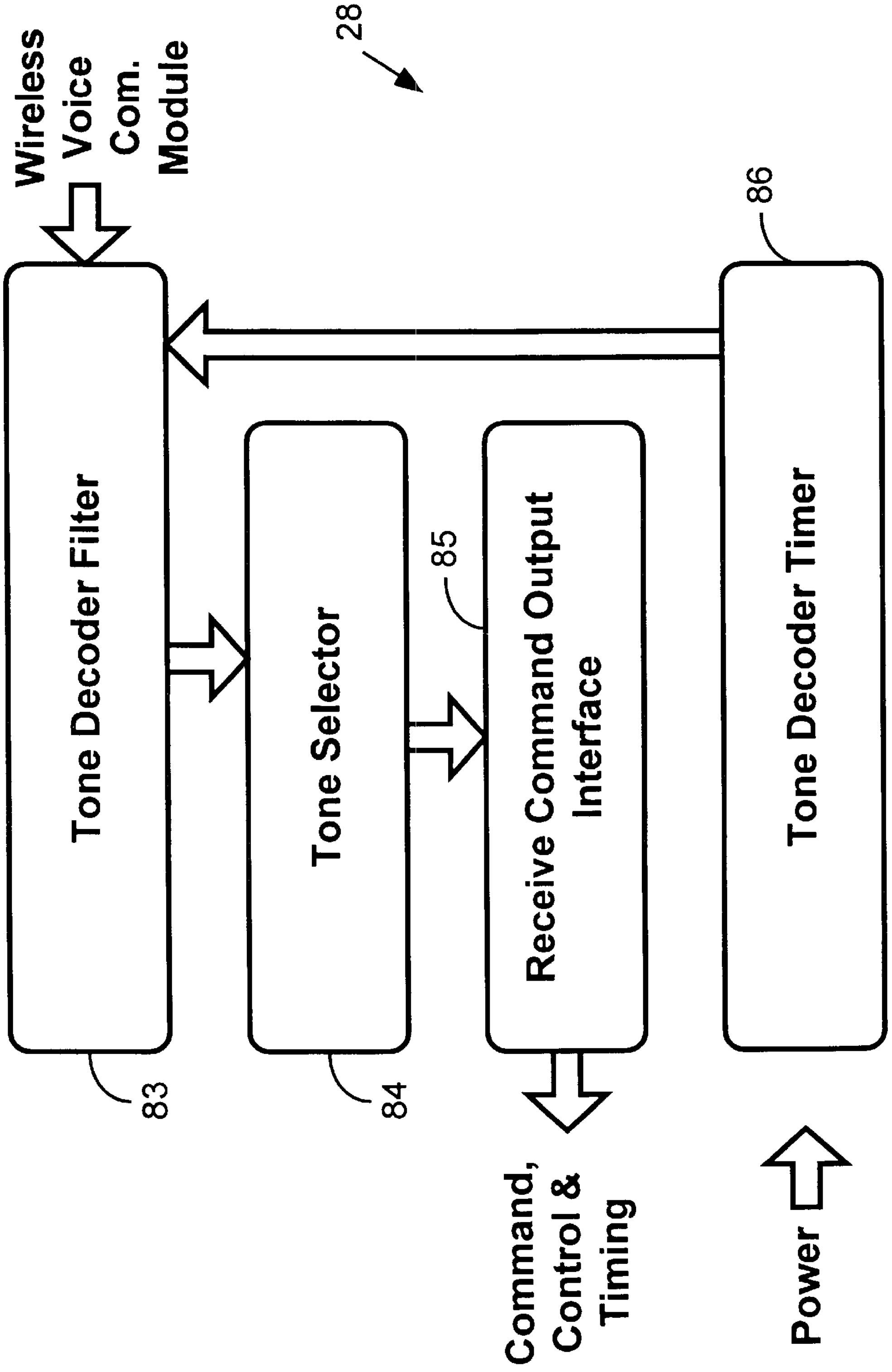
FIG. 14 illustrates a block diagram view of the Receive Command Tone Decoder Module of FIG. 2.

The Receive Command Tone Decoder Module 28, FIG. 14 in communication with the Wireless Voice Communications Module 15 has logic or data structures that command and control a tone decoder and filter 83 decodes all the dual frequency telephone tones sent from the recipient or third party and the special loop back tones being used for internal hardware logic switching functions. The tone decoder and filter 83 also filters out any extraneous transmission noise being received. A tone selector 84 selects a particular dual tone output that matches a specific system function command sent from the recipient or third party or used for internal switching functions. A receiver command output interface 85 converts each received dual tone output into its associated logic control or hardware switching function and sends the results to the Command, Control and Timing Module 22. Selected tones received from a recipient or third party may be used to remotely repeat previously sent information, retrieve different levels of additional vehicle and occupant information stored in the system memory of the vehicle and dynamically monitor the Real Time operation of the vehicle. A tone decoder timer 86 generates the timing signals to decode the dual frequency telephone tones and it sends the correct timing signal to the tone decoder and filter 83.

Figure 15:
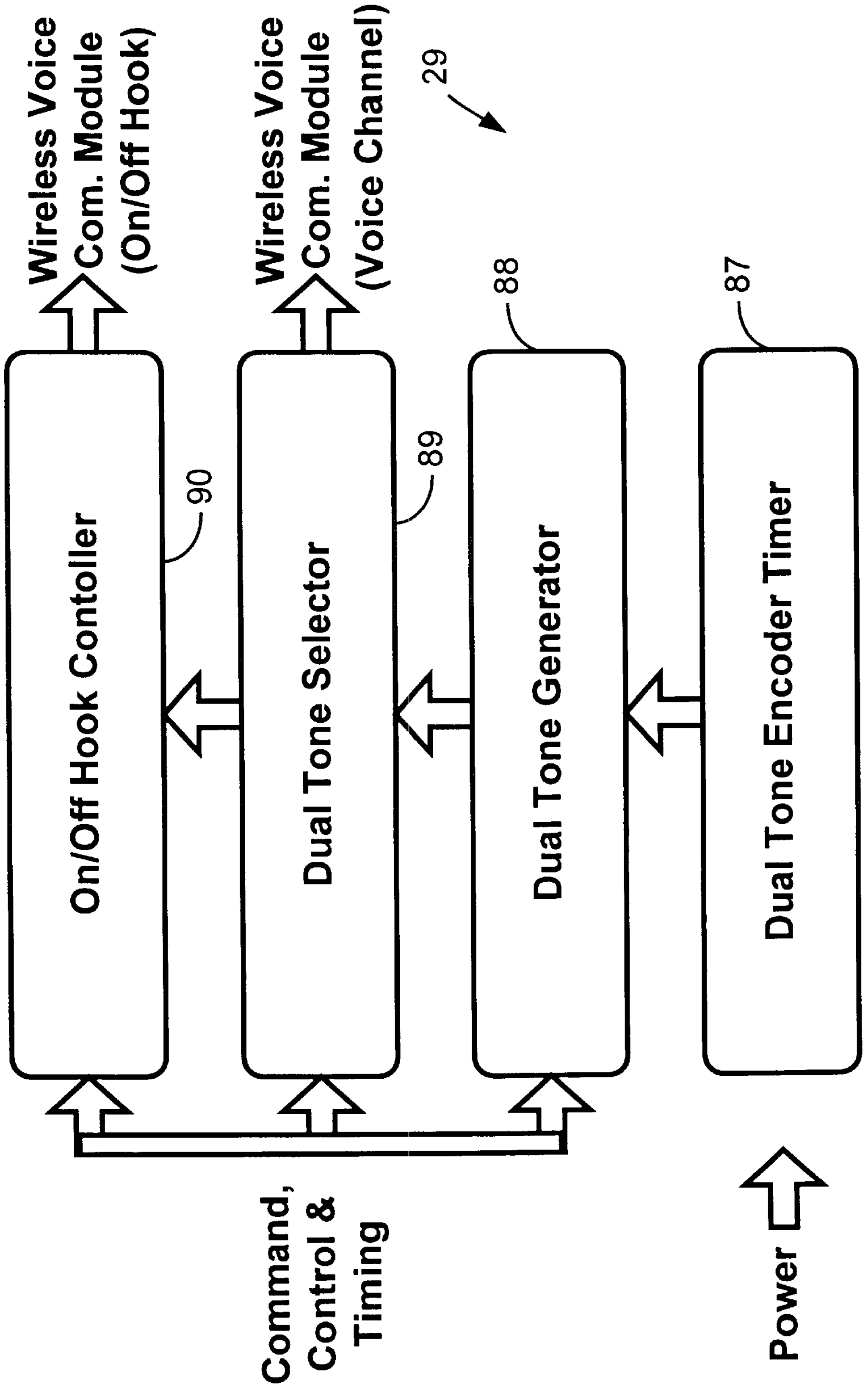
FIG. 15 illustrates a block diagram view of the Tone Generator and Automatic Dialer Module of FIG. 2.

The Tone Generator and Automatic Dialer Module 29, FIG. 15 in communication with the Wireless Voice Communications Module 15 has logic or data structures that command and control a dual tone encoder timer 87 to determine the timing signals required for dual tone generation. A dual tone generator 88 receives the timing signals from the dual tone encoder timer 87 and generates high band and low band frequencies that form the dual tones. The dual tone generator 88 adds the two frequencies together forming sixteen different dual tones for telephone dialing. A dual tone selector 89, receiving the dual tones from the dual tone generator 88, interprets calling directions from the Command, Control and Timing Module 22 and selects which dual tone is sent to the Wireless Voice Communications Module 15 to dial a selected telephone number. An on/off hook controller 90 receives the dialing instructions from the dual tone selector 89 and activates the controls of the on/off hook of telephone communication. When the on/off hook controller 90 is in the off hook mode, the Wireless Voice Communications Module 15 is activated and proceeds to dial the selected telephone number. Once the connection is verified, the synthetic voice message may be sent to the recipient or third party.

The present invention 10 may, if desired, be implemented by any combination of convenient hardware components or software programming language consistent with the precepts of the present invention or by any known means to those skilled in the art. A typical Global Position System Module 110, FIG. 16 is manufactured by TravRoute, Inc. with a manufacturer's part number of Co-Pilot 2000. The Global Position System Module 110 is connected to a Microprocessor Based Module 111 with an associated or connected Memory Module 112. The Microprocessor Based Module 111 is manufactured by J K Microsystems, Inc. and has a manufacturer's part number of Flashlite 386EX. The Memory Module 112 is manufactured by M-System, Inc. and has a manufacturer's part number of DiskOnChip 2000. The Microprocessor Based Module 111 is connected to a Speech Translation Module 113 manufactured by RC Systems, Inc. with a manufacturer's part number of V8600. The Speech Translation Module 113 is connected to a Wireless Voice Communications Module 114 manufactured by Motorola, Inc. with a manufacturer's part number of S1926D. The integration of the hardware component aspect of the present invention 10 is delineated herein.

The present invention 10 may, if desired, be programmed in any suitable programming language known to those skilled in the art. An example of a programming language is disclosed in *C Programming Language*, 2/e, Kernighan & Richtie, Prentice Hall, (1989). The integration of the software aspect with the hardware component of the present invention 10 is delineated herein.

The present invention 10 may, if desired, have three distinct operating modes: pre-collision with another vehicle or object, during the collision with another vehicle or object, and post-collision with another vehicle or object. Once electrical power is applied to start the vehicle by the user or driver the present invention 10 is automatically activated.

Figure 17:
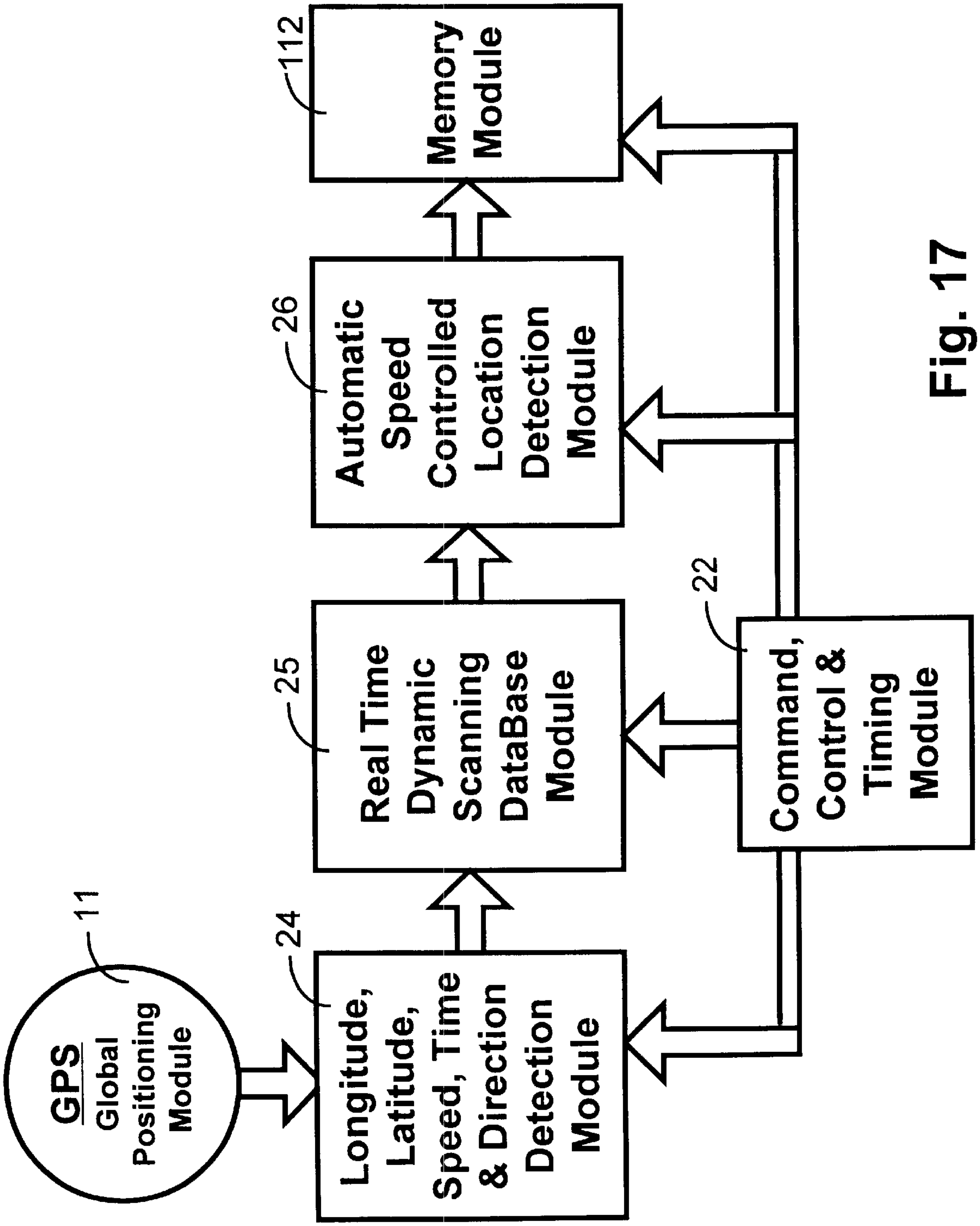
FIG. 17 illustrates a block diagram view of the operational aspect of FIG. 16 pre-collision.

The present invention 10, FIG. 17 begins receiving continuously updated navigational data at a selectable rate via the Global Positioning Module. The navigational data is decoded into the vehicle's present speed, time of day, direction, and location in terms of longitude and latitude via the Longitude, Latitude, Speed, Time, and Direction Detection Module 24. The Real Time Dynamic Scanning Database Module 25 receives the decoded navigation data and performs a match with its stored longitude and latitude street intersection locations, as delineated herein. The present invention 10 recognizes an approaching street intersection location from a selected distance from the vehicle. The distance or range to the street intersection location is dynamically controlled by the speed of the vehicle. When the longitude and latitude of the present location of the vehicle falls within the speed controlled range of the Automatic Speed Controlled Location Detection Module 13, a valid match occurs as delineated herein. All navigational data, scanning, and matched location data is stored in the System Memory Module 112 by the Command, Control, and Timing Module 22. The Command, Control, and Timing Module 22 ascertains that no collision has occurred, stores select vehicle and occupant information in archival files and updates the present invention 10 with new navigational data from the Global Positioning Module 11. This process continues while the vehicle is operating until it is involved in a collision with another vehicle or object.

Figure 18:
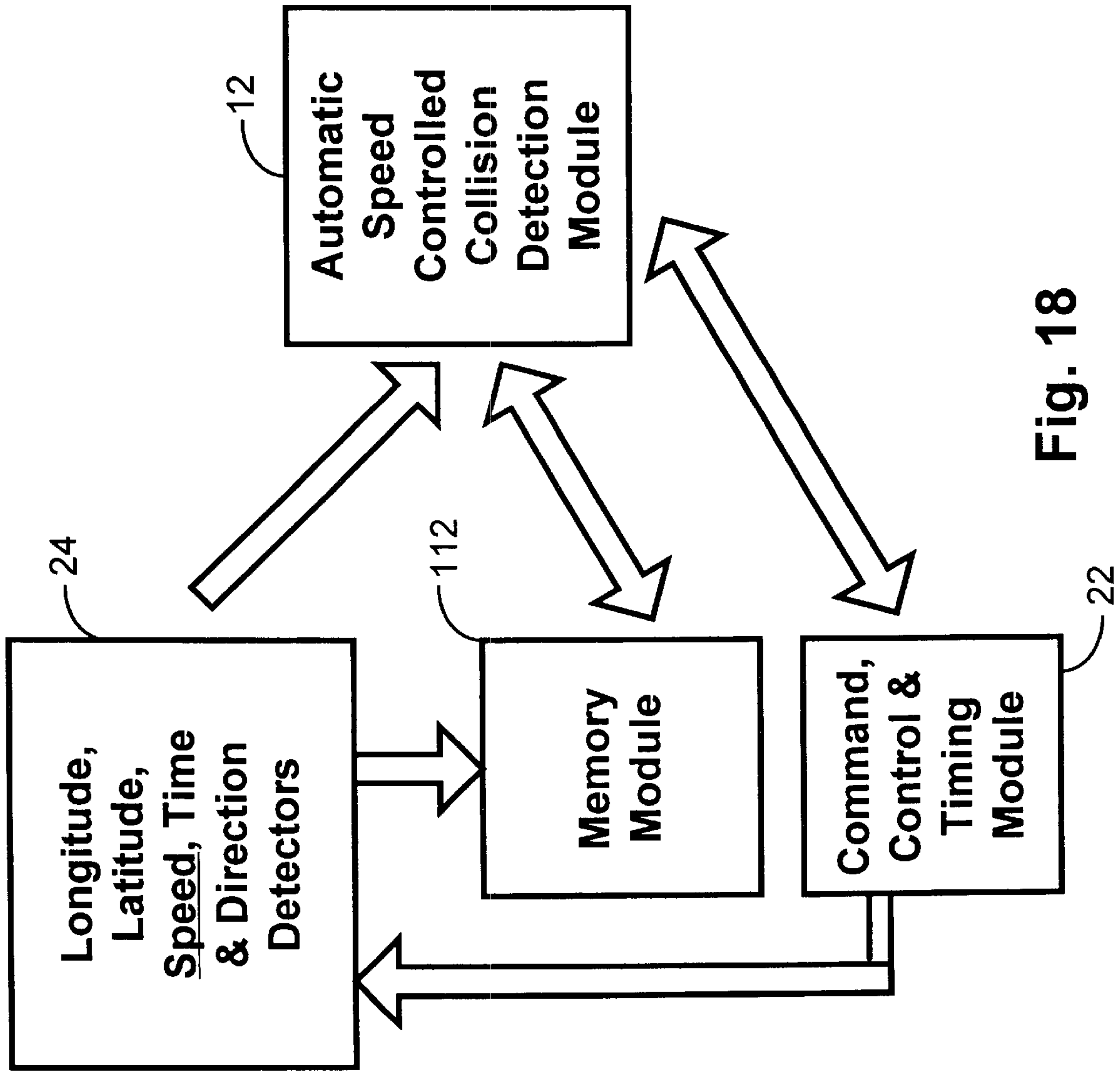
FIG. 18 illustrates a block diagram view of the operational aspect of FIG. 16, during a collision.
Figure 19:
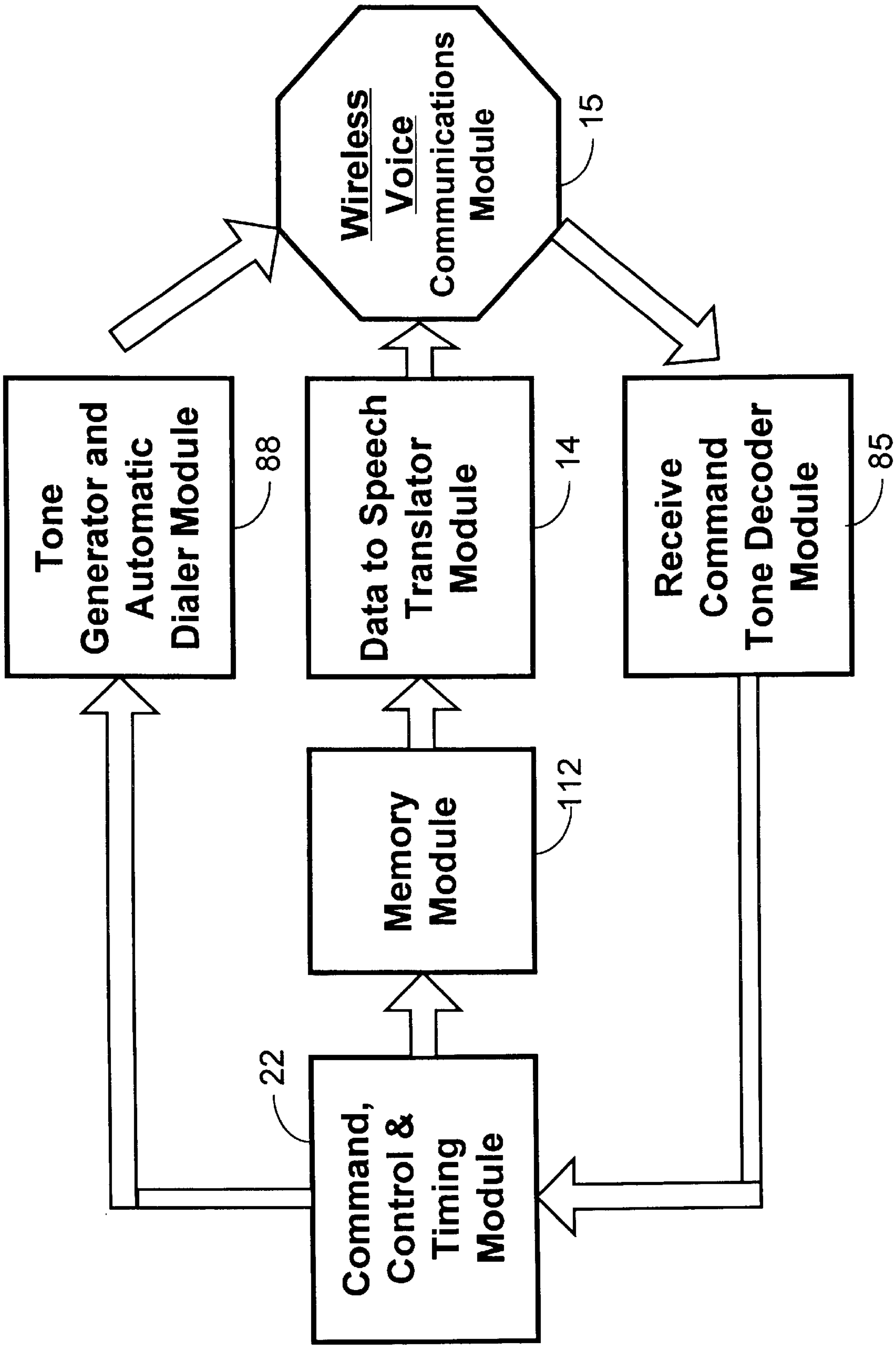
FIG. 19 illustrates a block diagram view of the operational aspect of FIG. 16, during post-collision.

When the vehicle containing the present invention 10, FIG. 18 is involved in a collision with another vehicle or object all the data concerning the vehicle's location and pertinent user data is stored in the System's Memory Module 112 via the Automatic Speed Controlled Collision Detection Module 12. Under the control of the Command Control and Timing Module 22, FIG. 19 the collision data is transformed into voice data by the Data to Speech Translation Module 14. The off-hook indicator in the vehicle indicates the wireless communication link has been activated. The Tone Generator and Automatic Dialer Module 88, FIG. 19 provide the Wireless Voice Communications Module 15 with the selected tones to dial any selected telephone number of the recipient or third party via an analog or digital telephone. The Data to Speech Translation Module 14 sends a synthetic voice request for transmittal confirmation. Once the Wireless Voice Communications Module 15 receives this transmittal confirmation command from the intended recipient or third party the Data to Speech Translation Module 14 can begin the synthetic voice transmission of the data concerning the vehicle's location and pertinent user data. The transmittal confirmation command may, if desired, be tones generated by the intended recipient or third party using their telephone. In addition to transmittal confirmation, the recipient or third party may be directed from the data received from the vehicle to press or dial numbers on their telephone Tone keypad in a selected order to have the vehicle re-send the previous information or send additional user and vehicle data. The recipient or third party may also use their Tone keypad to call the vehicle and with the proper identification request specific stored or real time information such as location, speed and direction.

Figure 20:
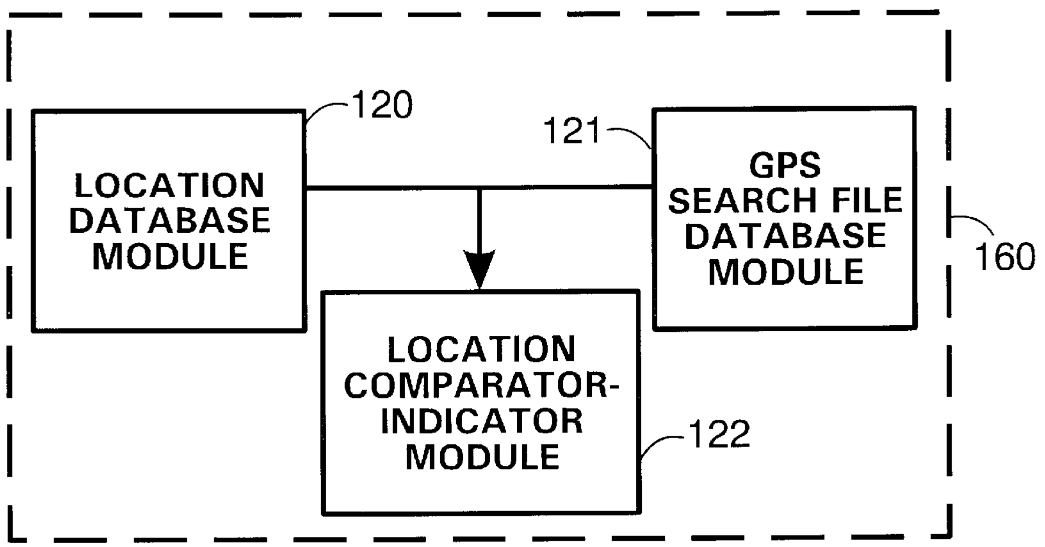
FIG. 20 illustrates a top level block diagram view of the Dynamic Vector Control Module.

The Command Control and Timing Module 22, FIG. 18 may, if desired, have data structures contained therein to repeat the initial communication effort by instructing the Wireless Voice Communications Module 15 to redial the initially selected telephone number. The redialing may, if desired, continue for a selected period of time. Typically, the redial period is from 3 seconds to about 3 minutes. Preferably, the redialing process is for 45 seconds. In the event the Receive Command Tone Decoder Module 85, FIG. 19 does not receive the transmittal confirmed command from the intended recipient or third party within a selected period of time the Command Control and Timing Module 22 will instruct the Tone Generator and Automatic Dialer Module 88 to provide the Wireless Voice Communications Module 15 with an alternate or subsequent recipient or third party telephone number. This redialing process continues until the communication link with the recipient or third party is established. The Command Control and Timing Module 22 may, if desired, repeat the entire dialing process any selected number of times until a communication link is established with the recipient or third party. The Real Time Dynamic Scanning Database Module 25, FIG. 8 has logic or data structures that select a database file to match the current navigational position to the derived navigational position via GPS Data to Base Code Translation Module 23. The logic or data structures that command and control the database file to match the current navigational position to the derived navigational position are formulated via the Dynamic Vector Control Module. The Dynamic Vector Control Module comprises a plurality of sub modules. The sub modules are the are a Location Database Module 120, FIG. 20, a GPS Search File Database Module 121, and a Location Comparator-Indicator Module 122. The Location Database Module 120, GPS Search File Database Module 121 and the Location Comparator-Indicator Module 122 create a dynamic, real-time longitude and latitude random access database tracking system.

The tracking system translates the longitude and latitude received from the GPS Global Positioning Module 11, FIG. 1*a* and appends a selected predetermined code to the translated longitude and latitude. The tracking system has stored in memory 112, FIG. 16 a matching translated longitude and latitude with a selected predetermined code appended thereto. The tracking system randomly accesses the stored translated longitude and latitude with a selected predetermined code and matches it to the incoming translated longitude and latitude with a selected predetermined code. The tracking system derives from the match a vector indicator denoting the present or projected location of the vehicle or object having the present invention 10 installed therein.

Figure 21:
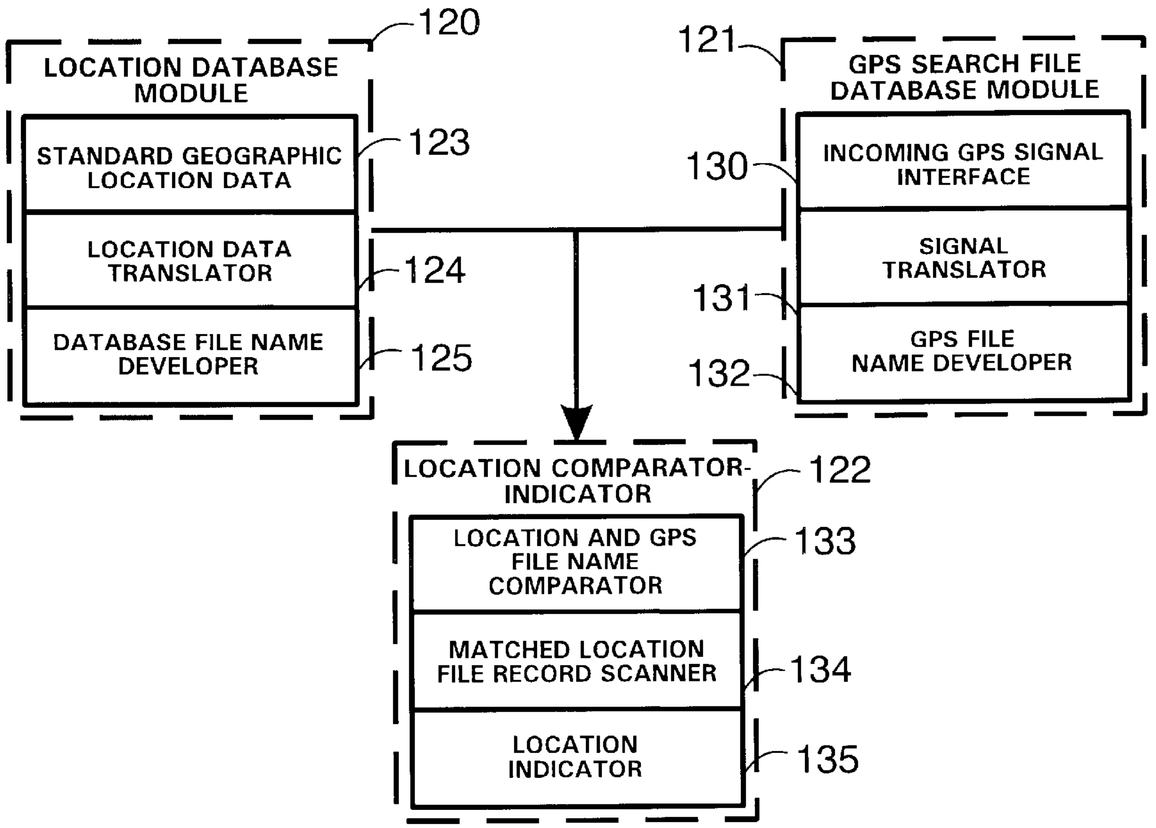
FIG. 21 illustrates a detailed block diagram view of the Dynamic Vector Control Module, of FIG. 20.

The Location Database Module 120, FIG. 21 has stored in memory 112, FIG. 16 the Standard Geographic Location Data 123, FIG. 21. The Standard Geographic Location Data 123 is global positional or navigational data. The global positional or navigational data may, if desired, be any surface, marine, or aircraft navigational data known in GPS technology. An example of Standard Geographic Location Data 123 is data provided from MapInfo or NavTech Corporations. The Standard Geographic Location Data 123 comprises a plurality of records each denoting a particular navigational position. Each record comprises a plurality of fields each containing data pertinent to global or navigational position or location.

The Location Database Module 120, FIG. 21 has logic or data structures formulated into a Location Data Translator 124. The Location Data Translator 124 selects a record from the Standard Geographic Location Data 123. The Location Data Translator 124 translates that record and temporally stores the translated record in memory. The Location Data Translator 124 begins the process of translating by selecting data fields from the record. The data fields selected are longitude, latitude, degree size, hemisphere, and rotation. These particular data fields are generally present in any particular global positional or navigational data selected for use in concert with the present invention 10. Longitude is defined as 0° to 180° (degrees) with 0° (degrees) at Greenwich, England. Latitude is defined as 0° to 90° (degrees) with 0° (degrees) at the Equator and 90° (degrees) at the North Pole for the Northern Hemisphere or 90° (degrees) at the South Pole for the Southern Hemisphere. Rotation is defined as longitudinal position East or West from 0° (degrees) at Greenwich, England. Degree size is defined as any symbol or groups of symbols indicating longitudinal degrees from 0° (degrees) to less than 100° (degrees) or longitudinal degrees from 100° (degrees) to 180° (degrees). The symbol may, if desired, be numeric, alphanumeric, or graphical. For example, longitudinal degrees from 0° (degrees) to less than 100° (degrees) are represented by the numeric value nine or longitudinal degrees from 100° (degrees) to 180° (degrees) are represented by a numeric value one. The parsing of the selected record in this manner yields 8 Location Sections starting with 4 quadrants determined by the Northern or Southern Hemisphere and by Longitude degrees being measured East or West of Zero Degrees from Greenwich England. Each of these quadrants can be further partitioned into 2 sections, the first containing Longitude Degrees from 00.0000 to 99.9999 and the other containing Longitude Degrees from 100.0000 to 180.0000.

Any convenient database know in the art of database technology may be used to create a plurality of records each defining a specific location on earth of interest. After appropriate data translation and conversion each record contains an initial file number, the Latitude and longitude for that specific location, text describing that location and information indicating in which of the eight location sections that location lies. A new eight digit record number is created by appending a shortened four digit longitude number to a shortened four digit latitude number.

A new database file number is also created and placed in memory using these same eight digits, adding a decimal and appending 3 characters that represent in which of the eight location sections this specific record location lies. Each record in the database is processed in the same manor. A new database file number is also created and stored for each unique eight digit record number found. A number of processed records will have the same new eight digit record number but will differ in the full accuracy latitude and longitude data, location text or location section information each record contains.

The Location Data Translator 124 latitude translation process: The initial latitude data contained in the selected record is defined in degrees, minutes, and decimal minutes. The Location Data Translator 124 translates the initial latitude data into degrees and decimal degrees. The decimal degrees are reformatted to reflect the decimal point being positioned between the hundredths and thousandths place value position and data remaining beyond the ten thousandths place value position is truncated. The reformatted decimal degrees are appended to the initial data degrees. The translated latitude is then reformatted as a whole number and is used as a latitude reference number. For example, the initial data is 3410.5472 (34 degrees, 10 minutes, 0.5472 decimal minutes). The initial data is converted to is degrees and decimal degrees. The converted number becomes 34.1757866 (34 degrees, 0.1757866 decimal degrees). The converted number after translation and truncation becomes translated latitude number 3417.57. The translated latitude number is reformatted as a whole number 3417 and is used as a latitude reference number.

The initial longitude data contained in the selected record is defined in degrees, minutes, and decimal minutes. The Location Data Translator 124 translates the initial longitude data into degrees and decimal degrees. The decimal degrees are reformatted to reflect the decimal point being positioned between the hundredths and thousandths place value position and data remaining beyond the ten thousandths place value position is truncated. The reformatted decimal degrees are appended to the initial data degrees. The translated longitude is then reformatted as a whole number and is used as a longitude reference number. The conversion process may be accomplished by any convenient means known in the art of converting a number of a given first base value into an equivalent second base value. For example, the initial longitude data is 08418.1644 (084 degrees, 18 minutes, 0.1644 decimal minutes). The initial data is converted to degrees and decimal degrees. The converted number becomes 84.30274 (84 degrees, 0.30274 decimal degrees). The converted number after translation and truncation becomes translated longitude number 8430.27. The translated longitude number is reformatted as a whole number 8430 and is used as a longitude reference number.

Since the translated longitude and latitude data is no longer identical to the initial longitude and latitude data a new record number is formulated-by appending the truncated longitude data, or longitude reference number, to the truncated latitude data, or latitude reference number creating a Location Database Reference Number. For example, truncated longitude number 8430 is appended to truncated latitude number 3417 to become Location Database Reference Number 34178430 which is also the new record number for that selected database record. All records in The Standard Geographic Location Data 123 are translated in the same manor creating a Location Database Reference Number and record number for each record based upon the latitude and longitude in it's data fields.

The Location Database Module 120, FIG. 21 has logic or data structures formulated into a Database File Name Developer 125, FIG. 21. The Database File Name Developer 125 is in communication with the Location Data Translator 124. The Database File Name Developer 125, FIG. 21 retrieves from memory the temporally stored translated longitude and latitude for a selected record. In this example, latitude is 3417.57 and longitude is 8430.27. The Database File Name Developer 125 further retrieves from memory the actual location defined by the longitude and latitude for that record. The location may, if desired, be a plurality of locations. For example, a given longitude and latitude has more than one street location intersecting with another street location. All locations are retrieved from memory. From other Positional Information contained in the selected record, the Database File Name Developer 125 formulates or constructs a predetermined code delineating degree size, rotation and hemisphere. The predetermined code is appended to the Location Database Reference Number and separated from this number by a decimal point creating a new Location Database File Name. The predetermined code may, if desired, have any place value or positional notation that is convenient. The preferred embodiment of the present invention 10 selects three place values to denote the various combinations of degree size, rotation and hemisphere. Table 1, FIG. 24 delineates some, but not all of the various combinations possible for indicating degree size, rotation and hemisphere. For example, the first place value is the symbol (9) 126 indicating the degree size is less than 100° (degrees) longitude. The second place value indicating the symbol (E) 127 indicating the rotation direction is East 0° to 180° (degrees). The third place value is a symbol (N) 128 indicating the hemisphere is Northern. The predetermined code may, if desired, contain alternate configurations with no loss in data integrity. For example, the predetermined code 9, E, N may have an alternate configuration of 0,0,N or Null, Null, N, (Null defined as no symbol). The alternative configuration of the predetermined code enables the user of the present invention 10 to compress data or reduce data memory storage when storing the longitude, latitude, and predetermined code in a translated record. As discussed herein, the Database File Name Developer 125 examines the data in each record in the Translated Location Database creating a new Location Database File Name for each unique translated record number found. Each translated record is then placed in the New Location Database File having the same name and Positional Information.

In summation, the translated navigational data record comprises a record number; longitude and latitude data, location data, and the derived predetermined code. The Database File Name Developer 125 has stored therein a plurality of files each containing a plurality of translated records denoting navigational data for all navigational positions on the globe or any selected portion thereof The user may, if desired, scan, sort, or perform other database manipulations on the stored data known in the art of database technology. After the above discussed process, the longitude and latitude will be naturally or by database manipulations be divided into 8 Location Sections starting with 4 quadrants determined by the Northern or Southern Hemisphere and by Longitude degrees being measured East or West of Zero Degrees from Greenwich England. Each of these quadrants is then further partitioned into 2 sections, the first containing Longitude Degrees from 00.0000 to 99.9999 and the other containing Longitude Degrees from 100.0000 to 180.0000. Each of the 8 Location Sections contains translated Random Access Files containing records pertaining to that particular portion on the globe.

The GPS Search File Database Module 121, FIG. 21 has logic or data structures formulated into an Incoming GPS Signal Interface 130 in communication with the GPS Global Positioning Module 11, FIG. 1*a*. A Signal Translator 131 is in communication with the Incoming GPS Signal Interface. The Signal Translator 131 translates the incoming GPS data in much the same way as the Location Database Module 120 has translated the stored translated navigational records. A GPS File Name Developer 132, similar to its counterpart the Database File Name Developer 125 formulates a GPS Search File Reference Number and from the GPS translated navigational data derives a predetermined code to append thereto.

The incoming GPS signal is translated into a unique navigational record containing data representing the type of signal, latitude, longitude, hemisphere and rotation. The Database File Name Developer 125, FIG. 21 defines a predetermined code derived from the selected GPS incoming signal data and appends that code to the GPS Search File Reference Number creating a GPS Search File Name.

The Location Comparator-Indicator 122, FIG. 21 has logic or data structures formulated into a Location and GPS File Name Comparator 133. The GPS File Name Comparator 133 compares the Location Database File Name to the GPS Search File Name. In the previous example, 34178430.9EN (location Database File Name) is compared to 34178430.9EN (GPS Search File Name). If no matching comparison is found the process is repeated every second (data rate of the incoming GPS signal) until a comparison is found.

When a matching comparison does occur between the Location Database File Name and the GPS Search File Name the process passes over to the Matched Location File Record Scanner 134, FIG. 21.

The Matched Location File Record Scanner opens the Location Database File having the same matching name as the GPS Search File and scans all the data in each record contained in the file looking for a match between the data it contains and the current or anticipated GPS Location Data Fields. If no exact match occurs the above discussed process repeats at the one second repetition rate of the incoming GPS signal.

A Location Indicator 135, FIG. 21 is in communication with the Matched Location File Record Scanner 134 and may receive a logically true indicator indicating an exact match. The Location Indicator 135 is in communication with the Real Time Dynamic Scanning Database Module 25, FIG. 8 and provides a logically true indication thereto indicating a lo navigational location has been determined and any or all of the Location Information contained in the Matched Record may, if desired, be transmitted, displayed, or recorded as desired by the user of the present invention 10.

Figure 22:
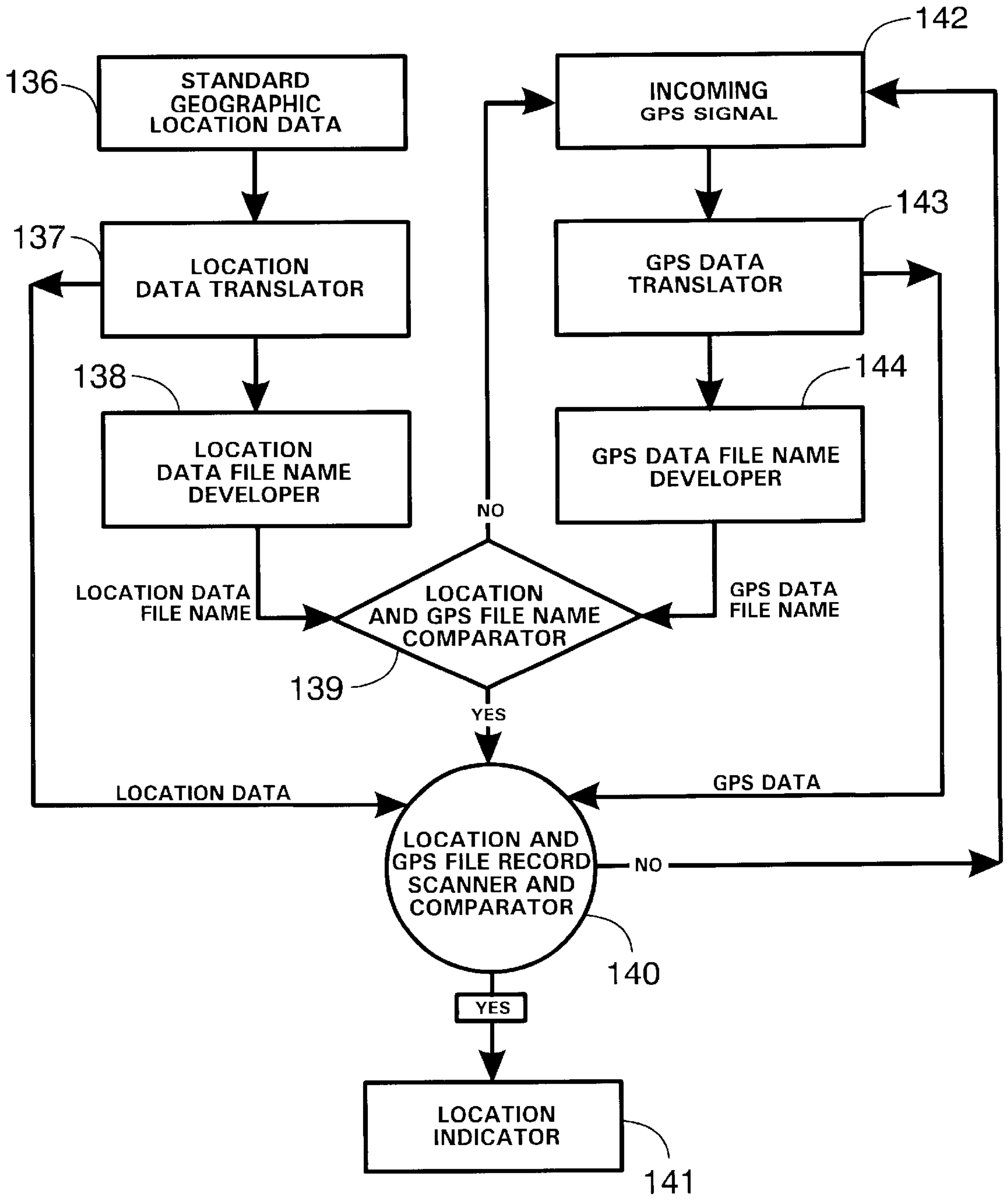
FIG. 22 illustrates a flow chart view of the Dynamic, Real Time Longitude and Latitude Random Access Database Search System of FIG. 21.
Figure 23:
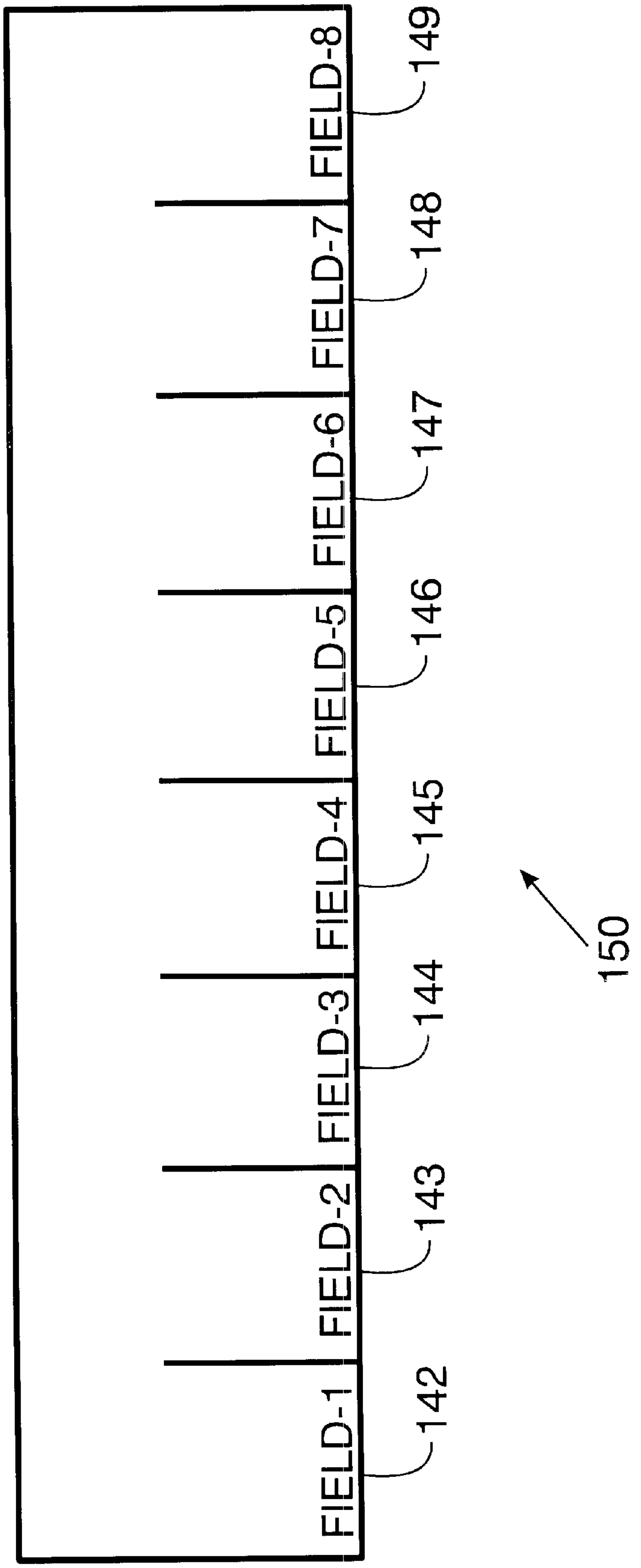
FIG. 23 illustrates a block diagram of a data field.

A logical flow of the determination of a match condition existing between the translated data fields contained in the records in the Database File Name Developer 125, FIG. 21 and the translated data fields created by the GPS File Name Developer 132 begins with selectively formulating the Standard Geographic Location Data 136, FIG. 22. The formulated data from the Standard Geographic Location Data 136 is translated into eight data fields 150, FIG. 23 by the Location Data Translator 137. Each data field contains data pertinent to navigational positioning or location. The data content as delineated above: Field-1, 142, FIG. 23 contains the record number data; Field-2, 143, contains latitude data; Field-3, 144, contains longitude data; Field-4, 145, contains location-1 data; Field-5, 146, contains location-2 data; Field-6, 147, contains degree size data; Field-7, 148, contains rotation data; and Field-8, 149, contains hemisphere data. The data fields 150 are processed and stored in memory by the Location Data Translator 137.

The Incoming GPS Signal 142, FIG. 22 is translated and temporarily stored in the same or like manner as the Standard Geographic Location Translator 137 by the GPS Data Translator 143. The translated GPS data is formulated into a GPS data file name by the GPS Data File Name Developer 144 and the predetermined code is derived and appended thereto. The location data file name is compared to the GPS data file name and if a match occurs 139 all the records contained in that file are scanned. The exact location data contained in the above discussed data fields 150 is analyzed for exact or anticipated data comparison with the received and translated GPS data 140. If the match is true, a Location Indicator 141 is generated and is transmitted to Real Time Dynamic Scanning Database Module 25 for further processing. If no exact match occurs the above discussed process repeats at the one second repetition rate of the incoming GPS signal.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together whereas a screw employs a helical surface, in the environment of fastening wooden parts, a nail and a screw may be equivalent structures.

I claim:

1. An apparatus for automatic vector generation of vehicle location, collision notification, and synthetic voice communication, the apparatus having a controller with a memory, a Global Positioning System transmitting navigational data, and means for wireless communication connectively disposed within a vehicle, the memory having stored therein a plurality of data structures formulated into instruction modules to direct the functioning of the controller, the memory further having stored therein at least one navigational location record comprising:

a) a Dynamic Vector Control Module selectively receiving data from the Global Positioning System, said Dynamic Vector Control Module selectively translating said received data into a vector geographical location of the vehicle's global navigational position;

b) an Automatic Speed Controlled Collision Detection Module receiving at least one vehicle collision indicator from at least one vehicle collision sensor;

c) said Automatic Speed Controlled Collision Detection Module deriving a collision event from said vehicle collision indicator relative to said vector geographical location;

d) a Data to Speech Translation Module in communication with said Automatic Speed Controlled Collision Detection Module, said Data to Speech Translation Module translating said collision event into a synthetic voice;

e) a Dynamic Speed Differential to Deceleration and Acceleration Generator in communication with said Automatic Speed Controlled Collision Detection Module;

f) said Dynamic Speed Differential to Deceleration and Acceleration Generator receiving navigational data;

g) said Dynamic Speed Differential to Deceleration and Acceleration Generator translating the received navigational data into an Acceleration data structure;

h) said Automatic Speed Controlled Collision Detection Module calculating acceleration of the vehicle via said Acceleration data structure;

i) said Dynamic Speed Differential to Deceleration and Acceleration Generator translating the received navigational data into a Deceleration data structure;

j) said Automatic Speed Controlled Collision Detection Module calculating deceleration of the vehicle via said Deceleration data structure;

k) said Automatic Speed Controlled Collision Detection Module determining a collision event;

l) a Nearest Location Detector calculating the vectorial distance between any two given vector geographical locations;

m) said Nearest Location Detector compensating for relative longitudinal variation in linear distance;

n) said Nearest Location Detector compensating for relative latitudinal variation in linear distance;

o) a GPS Data to Base Code Translator Module in communication with said Automatic Speed Controlled Collision Detection Module;

p) said GPS Data to Base Code Translator Module generating error free navigational data to said Automatic Speed Controlled Collision Detection Module;

q) a Longitude, Speed, Time and Direction Detection Module in communication with said Automatic Speed Controlled Collision Detection Module;

r) said Longitude, Speed, Time and Direction Detection Module generating a direction of travel function;

s) said direction of travel function comprising at least one segmental direction of travel record;

t) said Data to Speech Translation Module translating said segmental direction of travel record into a synthetic voice;

u) a Virtual Directional Global Positioning System having a Virtual Antenna;

v) said Virtual Directional Global Positioning System in communication with said Longitude, Speed, Time and Direction Detection Module;

w) said Virtual Antenna receiving at least one delta vector data structure via said Longitude, Speed, Time and Direction Detection Module;

x) said Virtual Antenna reception angle calculated from said delta vector data structure;

y) said Virtual Antenna's positional rotation calculated from said delta vector data structure;

whereby said Virtual Antenna being positionally rotated and said selected reception angle calculated thereby providing a dead-reckoning of the vehicle.

2. An apparatus for automatic vector generation of vehicle location as recited in claim 1 wherein said delta vector data structure being the relative change in any two sequential said vector geographical locations.

3. An apparatus for automatic vector generation of vehicle location as recited in claim 2 wherein said delta vector data structure containing selectable distance data.

4. An apparatus for automatic vector generation of vehicle location as recited in claim 3 wherein said delta vector data structure containing speed data.

5. An apparatus for automatic vector generation of vehicle location as recited in claim 1 further comprising:

a) a Speed to Record Detector Range Converter in communication with said Data to Speech Translation Module;

b) said Speed to Record Detector Range Converter selectively receiving said delta vector data structure;

c) said Speed to Record Detector Range Converter deriving an R-factor from said delta vector data structure;

whereby Data to Speech Translation Module enunciates geographical position relative to said R-factor.

6. An apparatus for automatic vector generation of vehicle location as recited in claim 5 further comprising:

d) a Rapid Directional Change Detector in communication with said Automatic Speed Controlled Collision Detection Module;

e) said Rapid Directional Change Detector responsive to said vector geographical location;

f) said Rapid Directional Change Detector generating a selected collision threshold level data structure;

whereby said Automatic Speed Controlled Collision Detection Module formulating said collision event.

* * * * *